United States Patent
Yamamoto et al.

(10) Patent No.: US 11,907,746 B2
(45) Date of Patent: Feb. 20, 2024

(54) COMPOUND STORAGE SYSTEM

(71) Applicant: Hitachi, Ltd., Tokyo (JP)

(72) Inventors: Akira Yamamoto, Tokyo (JP); Hiroto Ebara, Tokyo (JP); Takaki Nakamura, Tokyo (JP); Yoshinori Ohira, Tokyo (JP)

(73) Assignee: Hitachi, Ltd., Tokyo (JP)

(*) Notice: Subject to any disclaimer, the term of this patent is extended or adjusted under 35 U.S.C. 154(b) by 395 days.

(21) Appl. No.: 17/186,850

(22) Filed: Feb. 26, 2021

(65) Prior Publication Data

US 2022/0100547 A1     Mar. 31, 2022

(30) Foreign Application Priority Data

Sep. 25, 2020 (JP) ................................. 2020-161152

(51) Int. Cl.
    *G06F 9/455*     (2018.01)
    *G06F 9/30*      (2018.01)
    *G06F 3/06*      (2006.01)

(52) U.S. Cl.
    CPC ........ *G06F 9/45558* (2013.01); *G06F 3/0604* (2013.01); *G06F 3/067* (2013.01); *G06F 3/0631* (2013.01); *G06F 3/0664* (2013.01); *G06F 3/0689* (2013.01); *G06F 9/30047* (2013.01); *G06F 2009/4557* (2013.01); *G06F 2009/45595* (2013.01)

(58) Field of Classification Search
    CPC .................................................... G06F 3/0604
    USPC ............................................................. 718/1
    See application file for complete search history.

(56) References Cited

U.S. PATENT DOCUMENTS

| | | | |
|---|---|---|---|
| 8,601,473 B1* | 12/2013 | Aron | G06F 16/1748 718/1 |
| 9,075,530 B2* | 7/2015 | Esaka | G06F 3/065 |
| 9,760,294 B2* | 9/2017 | Miwa | G06F 3/0689 |
| 10,248,460 B2* | 4/2019 | Kaneko | G06F 3/0665 |
| 11,048,546 B1* | 6/2021 | Shibayama | G06F 3/0635 |
| 11,620,156 B2* | 4/2023 | Tsirkin | G06F 11/0772 718/1 |
| 2010/0262772 A1* | 10/2010 | Mazina | G06F 3/0635 711/E12.001 |
| 2012/0042034 A1* | 2/2012 | Goggin | G06F 3/0647 709/216 |

(Continued)

FOREIGN PATENT DOCUMENTS

| JP | 2008-198221 A | 8/2008 |
|---|---|---|
| JP | 2016-510440 A | 4/2016 |
| WO | WO 2018/029820 A1 | 2/2018 |

*Primary Examiner* — Mehran Kamran
(74) *Attorney, Agent, or Firm* — BAKER BOTTS L.L.P.

(57) ABSTRACT

A compound storage system including: a storage box having a plurality of storage devices; and a plurality of servers capable of executing one or more virtual machines. The storage box stores a logical volume. The virtual machines executable by the server include an application VM and a controller VM. When a predetermined situation occurs in which an application VM of a migration source server is migrated to a predetermined migration destination server, at least one processor of the one or more servers in the compound storage system migrates the application VM to the migration destination server, and migrates a control right of a logical volume used by the application VM to a controller VM of the migration destination server.

8 Claims, 22 Drawing Sheets

(56) References Cited

U.S. PATENT DOCUMENTS

| | | | |
|---|---|---|---|
| 2013/0297903 A1* | 11/2013 | Kaneko | G06F 3/064 711/E12.002 |
| 2014/0181804 A1* | 6/2014 | Sakata | G06F 9/5088 718/1 |
| 2015/0317088 A1* | 11/2015 | Hussain | G06F 3/0688 711/103 |
| 2015/0317176 A1* | 11/2015 | Hussain | G06F 3/067 718/1 |
| 2015/0317177 A1* | 11/2015 | Hussain | H04L 67/1097 718/1 |
| 2015/0319243 A1* | 11/2015 | Hussain | G06F 3/0689 709/217 |
| 2016/0014200 A1* | 1/2016 | Murrish | H04L 67/1095 709/219 |
| 2016/0117127 A1* | 4/2016 | Yamamoto | G06F 3/0608 711/114 |
| 2016/0162438 A1* | 6/2016 | Hussain | H04L 43/04 709/212 |
| 2016/0196082 A1* | 7/2016 | Bhardwaj | G06F 3/0614 711/162 |
| 2016/0203069 A1* | 7/2016 | Gill | G06F 11/2094 709/224 |
| 2018/0011732 A1* | 1/2018 | Aron | G06F 9/45558 |
| 2018/0157677 A1* | 6/2018 | Bafna | G06F 9/45533 |
| 2018/0165166 A1* | 6/2018 | Wang | G06F 11/2033 |
| 2018/0232142 A1* | 8/2018 | Shekar | G06F 11/2046 |
| 2018/0285016 A1* | 10/2018 | Akutsu | G06F 3/067 |
| 2019/0266002 A1* | 8/2019 | Nishikawa | G06F 3/06 |
| 2020/0026576 A1* | 1/2020 | Kaplan | G06F 16/2282 |
| 2020/0104153 A1* | 4/2020 | Shibayama | G06F 3/0658 |
| 2021/0026673 A1* | 1/2021 | Forney | H04L 67/1031 |
| 2021/0263762 A1* | 8/2021 | Kachare | G06F 12/0868 |
| 2021/0326165 A1* | 10/2021 | Shibayama | G06F 3/067 |
| 2021/0390080 A1* | 12/2021 | Tripathi | G06F 21/62 |
| 2022/0100547 A1* | 3/2022 | Yamamoto | G06F 3/0689 |

* cited by examiner

FIG. 9

| | |
|---|---|
| LOGICAL VOLUME IDENTIFIER | ~2001 |
| LOGICAL CAPACITY | ~2002 |
| LOGICAL VOLUME TYPE | ~2005 |
| LOGICAL VOLUME RAID TYPE | ~2003 |
| REAL PAGE POINTER | ~2006 |
| ⋮ | |
| REAL PAGE POINTER | ~2006 |
| FIRST READ COUNT | ~2007 |
| FIRST WRITE COUNT | ~2008 |
| SECOND READ COUNT | ~2009 |
| SECOND WRITE COUNT | ~2010 |
| LUN MIGRATING FLAG | ~2015 |
| LUN MIGRATION SOURCE IDENTIFIER | ~2016 |
| MIGRATION POINTER | ~2017 |
| MIGRATION WAITING FLAG | ~2018 |
| MIGRATING FLAG FOR DEACTIVATION | ~2019 |
| MIGRATION SOURCE LUN FOR DEACTIVATION | ~2020 |
| CACHE MANAGEMENT POINTER | ~2022 |
| ⋮ | |
| CACHE MANAGEMENT POINTER | ~2022 |

2000

2100

2900

COMPOUND STORAGE SYSTEM

BACKGROUND OF THE INVENTION

1. Field of the Invention

The present invention relates to a compound storage system including a storage box having one or more storage devices and a plurality of servers.

2. Description of the Related Art

There is known a system in which a storage box accommodating a plurality of storage devices is shared by a plurality of storage controllers (see, for example, JP 2016-510440 A). In techniques described in JP 2016-510440 A, the plurality of storage controllers share the plurality of storage boxes. JP 2016-510440 A discloses a technique of migrating control right of a logical unit (LU) of a logical volume specified by a server from a system including an existing storage controller to a system including a newly added storage controller at the time of reading or writing data when the system including the new storage controller is added or the like. In addition, JP 2016-510440 A discloses a technique of determining any storage controller to which a right is allocated, the right to allocate a storage area of a newly added storage box, that is, the right to determine any system including any storage controller to which any storage area is allocated regarding determination of any storage area of any LU as an allocation destination, for example, when the new storage box is added or the like.

In addition, as a technique related to a storage system, a technique called a hyper-converged architecture is known (see, for example, WO 2018/029820 A). In this architecture, a virtual machine (VM) on which an application runs and a VM on which a storage controller operates are mounted on the server, and the server has an internal storage. Storage controllers on a plurality of servers are connected via a network. WO 2018/029820 A discloses a technique of displaying storage controllers on individual servers and an internal storage together in a single virtual storage system for an application. In addition, WO 2018/029820 A discloses a technique of once stopping the application running on a VM on a server, migrating the application to another server, and restarting the running on a VM on the other server.

In addition, as a technique related to storage, there is known a capacity virtualization technique called thin provisioning (see, for example, JP 2008-198221 A). In the technique disclosed in JP 2008-198221 A, a virtual storage also has a capacity virtualization function. In the capacity virtualization function, a storage area having a relatively large capacity, called a capacity pool, is divided into sections called pages. Conventionally, a capacity for an LU is also specified at the time of defining the LU, and a storage area corresponding to this capacity is secured in a storage. On the other hand, in the virtual storage having the capacity virtualization function, a storage area is not secured at the time of defining the LU, and the e page is allocated to the corresponding area when write actually occurs. As a result, the actually allocated storage area can be reduced. In addition, a trigger for allocating the storage area is a trigger for the occurrence of write, and thus, an administrator does not have to strictly calculate the capacity of the LU, but only needs to define a relatively large capacity, so that the management cost can be also reduced.

SUMMARY OF THE INVENTION

For example, when a new storage controller is added to a storage system or the like, it is conceivable to migrate a control right of a logical volume specified by a server from the existing storage controller to the newly added storage controller. For example, when a new server is added, it is conceivable to migrate a control right of a logical volume, the control right possessed by a storage controller operating on a VM of an existing server, to a storage controller that operates on a VM of the newly added server.

Here, the logical volume is used by an application running on the VM of the existing server. When the application uses the logical volume, an IO request (read/write request) for the logical volume is issued to the storage controller on the server where the application is running, this storage controller transmits the IO request for the logical volume to the storage controller of the added server, and as a result, IO processing on the logical volume. Therefore, there is a problem that the IO efficiency of the logical volume due to the application deteriorates.

The present invention has been made in view of the above circumstances, and an object thereof is to provide a technique capable of improving the IO efficiency for a logical volume.

In order to achieve the above object, a compound storage system according to one aspect is a compound storage system including a storage box having a plurality of storage devices and a plurality of servers capable of executing one or more virtual machines. The storage box stores a logical volume, and the virtual machines executable by the server include an application virtual machine (VM) that executes an application using the logical volume, and a controller VM that configures a controller capable of controlling read and write with respect to a logical volume for which the controller has a control right. When a predetermined situation occurs in which an application VM of a migration source server is migrated to a predetermined migration destination server, at least one processor of the one or more servers in the compound storage system migrates the application VM to the migration destination server, and migrates a control right of a logical volume used by the application VM to a controller VM of the migration destination server.

According to the present invention, the IO efficiency to the logical volume can be improved.

BRIEF DESCRIPTION OF THE DRAWINGS

FIG. 9 is a configuration diagram of logical volume information according to the embodiment;

DESCRIPTION OF THE PREFERRED EMBODIMENTS

An embodiment will be described with reference to the drawings. Incidentally, the embodiment to be described hereinafter does not limit the invention according to the claims, and further, all of the elements described in the embodiment and combinations thereof are not necessarily indispensable for the solution of the invention.

Figure 1:
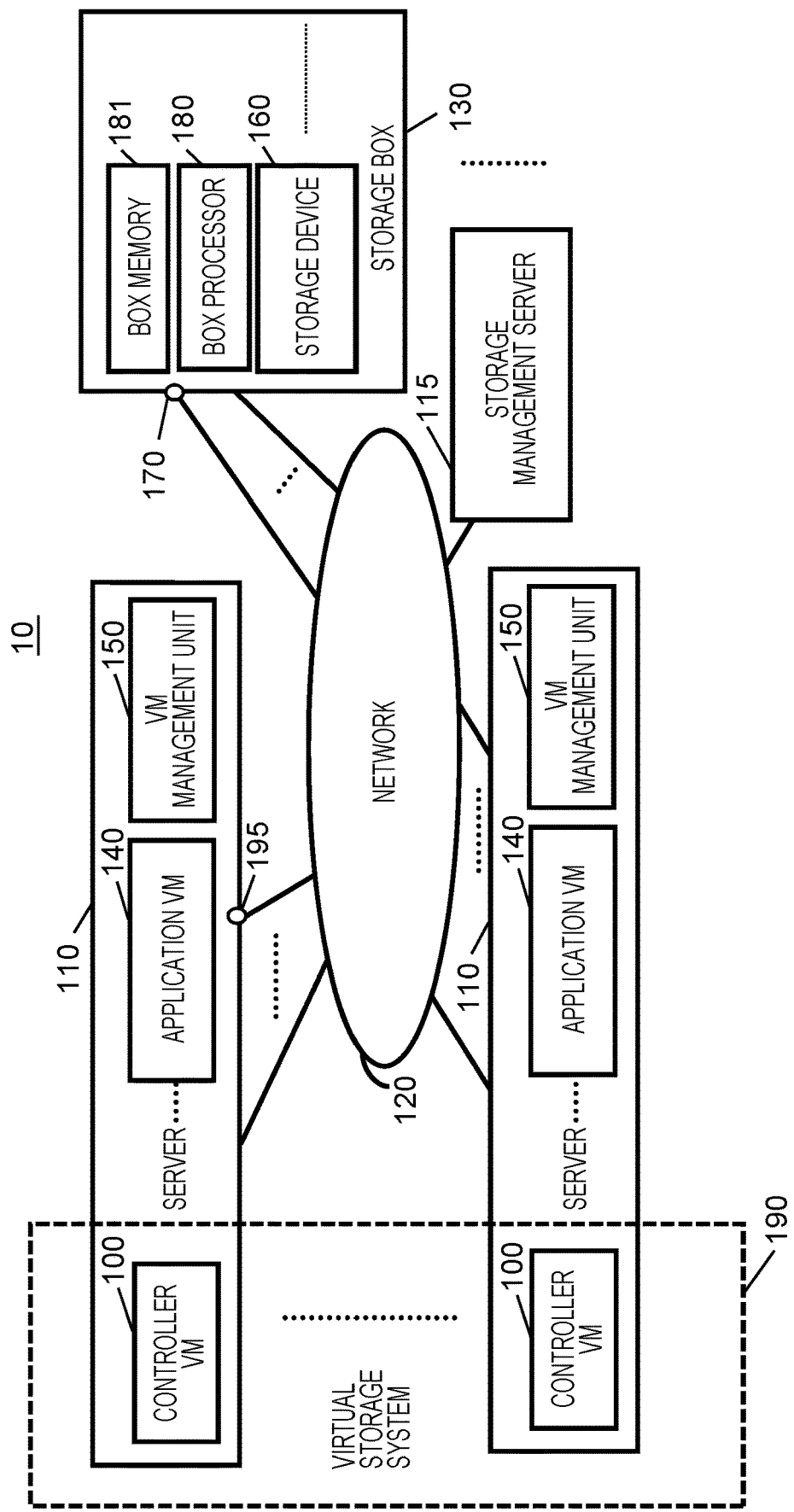
FIG. 1 is an overall configuration diagram of a compound storage system according to an embodiment.

FIG. 1 is an overall configuration diagram of a compound storage system according to an embodiment.

A compound storage system 10 includes one or more storage boxes 130, one or more servers 110, a network 120, and a storage management server 115. The network 120 connects the storage boxes 130, the servers 110, and the storage management server 115. The servers 110 are connected to the network 120 via one or more server ports 195. The storage boxes 130 are connected to the network 120 via box ports 170.

The server 110 is a computer provided with, for example, a processor, a memory, a storage device, and the like, and includes one or more VMs 140 (application VMs) equipped with applications, a VM 100 (controller VM) equipped with a storage controller, and a VM management unit 150 that manages VMs. Note that the application or the storage controller may operate as a container.

The application VM 140 executes the application, and issues an IO request (read/write request) to read/write data to the controller VM 100 operating on the same server 110.

The controller VM 100 transmits the request via the network 120 to the storage box 130 that stores data specified by the IO request received from the application VM 140. The respective controller VMs 100 of the respective servers 110 transmit and receive data to and from each other via the network 120. Although an example in which the controller VM 100 has a so-called capacity virtualization function is illustrated in the present embodiment, the controller VM 100 does not necessarily have the capacity virtualization function.

The VM management units 150 of the respective servers 110 exchanges information, such as information on VMs, with each other via the network 120.

The network 120 may follow a protocol such as NVM-e over Ethernet (Ethernet is a registered trademark).

In the present embodiment, a virtual storage system 190 is configured using the plurality of controller VMs 100 on the respective servers 110. For the application VMs 140 of the respective servers 110, the virtual storage system 190 appears to be one storage system. Note that the virtual storage system 190 is not necessarily configured.

The storage box 130 includes one or more storage devices 160, one or more box ports 170, one or more box processors 180, and a box memory 181.

The box port 170 is a port configured to connect the storage box 130 with the network 120. The storage device 160 is a device provided with a storage medium to store data, and is a hard disk drive (HDD) or a flash storage using a flash memory as a storage medium, for example. There are several types of flash storage used in the storage device 160, which includes SLC with high price, high performance, and a large number of erasable times, and MLC with lower price, lower performance, and a smaller number of erasable times as compared with the SLC. In addition, the storage medium of the storage device 160 may include a new storage medium such as a phase change memory. In the present embodiment, the storage device 160 of the storage box 130 is shared by the plurality of controller VMs 100. Therefore, the storage device 160 in the storage box 130 may be referred to as a common storage device. In the present embodiment, it is assumed to have a redundancy array independent device (RAID) function that can recover data of a device even if the device as one of the storage devices 160 fails. When the RAID function is provided, a plurality of storage devices of the same type have one RAID configuration. This RAID configuration is referred to as a storage group. In the present embodiment, for example, the RAID configuration is configured using a set of the storage devices 160 in one storage box 130. Note that the RAID function is not necessarily provided.

The box processor 180 executes a migration process with the storage device 160 according to an instruction of the controller VM 100. The box memory 181 stores a program and information to be used by the box processor 180.

The storage box 130 is connected to one or more controller VMs 100 in the virtual storage system 190 via the network 120. The storage box 130 is not necessarily connected to all the controller VMs 100 in the virtual storage system 190. In addition, a set of storage boxes 130 connected to one controller VM 100 may be the same with or different from a set of storage boxes 130 connected to another controller VM 100. The storage box 130 is shared by several controller VMs 100 via the network 120.

The storage management server 115 is a device used for management by an administrator of the compound storage system 10, and communicates with the controller VM 100 and the storage box 130 via the network 120 or the like to collect various types of information or to perform setting of the respective devices.

Next, application VM management information managed by the application VM 140 will be described.

Figure 2:
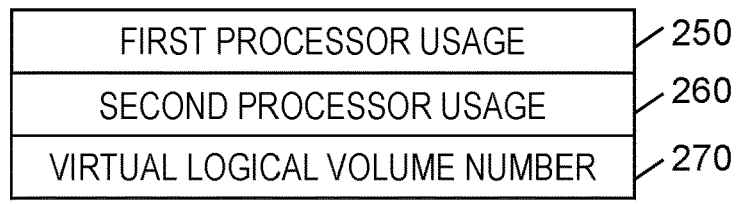
FIG. 2 is a configuration diagram of application VM management information according to the embodiment.

FIG. 2 is a configuration diagram of the application VM management information according to the embodiment.

The application VM management information includes a first processor usage 250, a second processor usage 260, and a virtual logical volume number 270.

The first processor usage 250 and the second processor usage 260 represent processor usages of the application VM 140 that stores the application VM management information. The first processor usage 250 indicates a processor usage from a predetermined time point to the current time, and is cleared to zero when a predetermined time has elapsed and indicates a processor usage since such a time point. The second processor usage 260 represents a processor usage of the application VM 140 for a predetermined time, and a value of the first processor usage 250 when the predetermined time has elapsed is copied.

The virtual logical volume number 270 is an identifier of a logical volume used by the application VM 140, and has one or more values. When issuing an IO request (read request or write request), the application VM 140 specifies the virtual logical volume number 270 and a relative address in a logical volume. In the present embodiment, the VM management units 150 of the respective servers 110 exchange information on the application VM management information with each other to perform a process of migrating the application VM 140 between the servers 110.

Next, a configuration of the controller VM 100 will be described.

Figure 3:
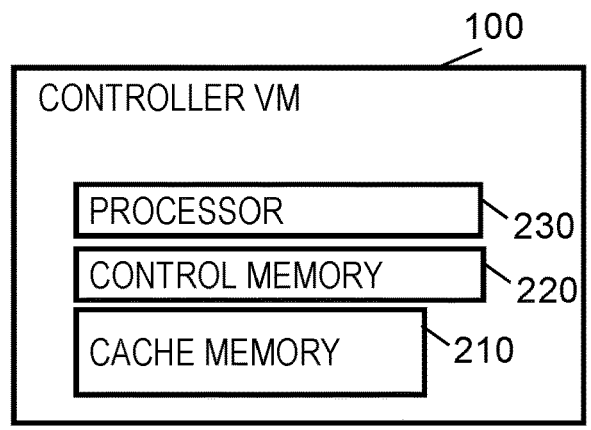
FIG. 3 is a configuration diagram of a controller VM according to the embodiment.

FIG. 3 is a configuration diagram of the controller VM according to the embodiment.

The controller VM 100 has a cache memory 210, a control memory 220, and a processor 230. The cache memory 210 and the control memory 220 are configured as a part of a memory of the server 110 is allocated for the controller VM 100. In addition, the processor 230 is configured as a part of a processor of the server 110 or a part of processing time by the processor is allocated for the controller VM 100. In the present embodiment, when the application VM 140 is migrated between the servers 110, a control right of a virtual logical volume used by the application VM 140 is migrated between the controller VM 100.

The cache memory 210 stores data that is frequently accessed by the controller VM 100 among pieces of data stored in the storage device 160 of the storage box 130. The controller VM 100 receives an IO request from the application VM 140. When receiving a read request from application VM 140, the controller VM 100 reads data from the storage device 160 corresponding to the read request, stores the data in the cache memory 210, and passes the data to the application VM 140. Note that the read data is not necessarily stored in the cache memory 210. On the other hand, when receiving a write request from the application VM 140, the controller VM 100 completes the write request at a stage where received write data is written to the cache memory 210, that is, sends a response to the write request, and then, writes the write data to the storage device 160 corresponding to the write request. Note that the write request may be completed after the received write data is written to the storage device 160 corresponding to the write request.

The control memory 220 stores a program and information (controller VM management information) required for various processes performed by the controller VM 100.

The processor 230 executes various processes by executing the program stored in the control memory 220.

Next, a configuration of the cache memory 210 will be described.

Figure 4:
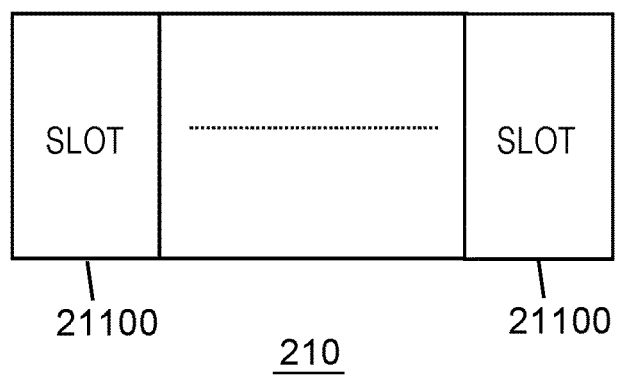
FIG. 4 is a configuration diagram of a cache memory according to the embodiment.

FIG. 4 is a configuration diagram of the cache memory according to the embodiment.

The cache memory 210 is managed in the state of being divided into, for example, slots 21100 each having a fixed length. The slot 21100 serves as an allocation unit of read/write data.

Next, the controller VM management information managed in the control memory 220 of the controller VM 100 will be described.

Figure 5:
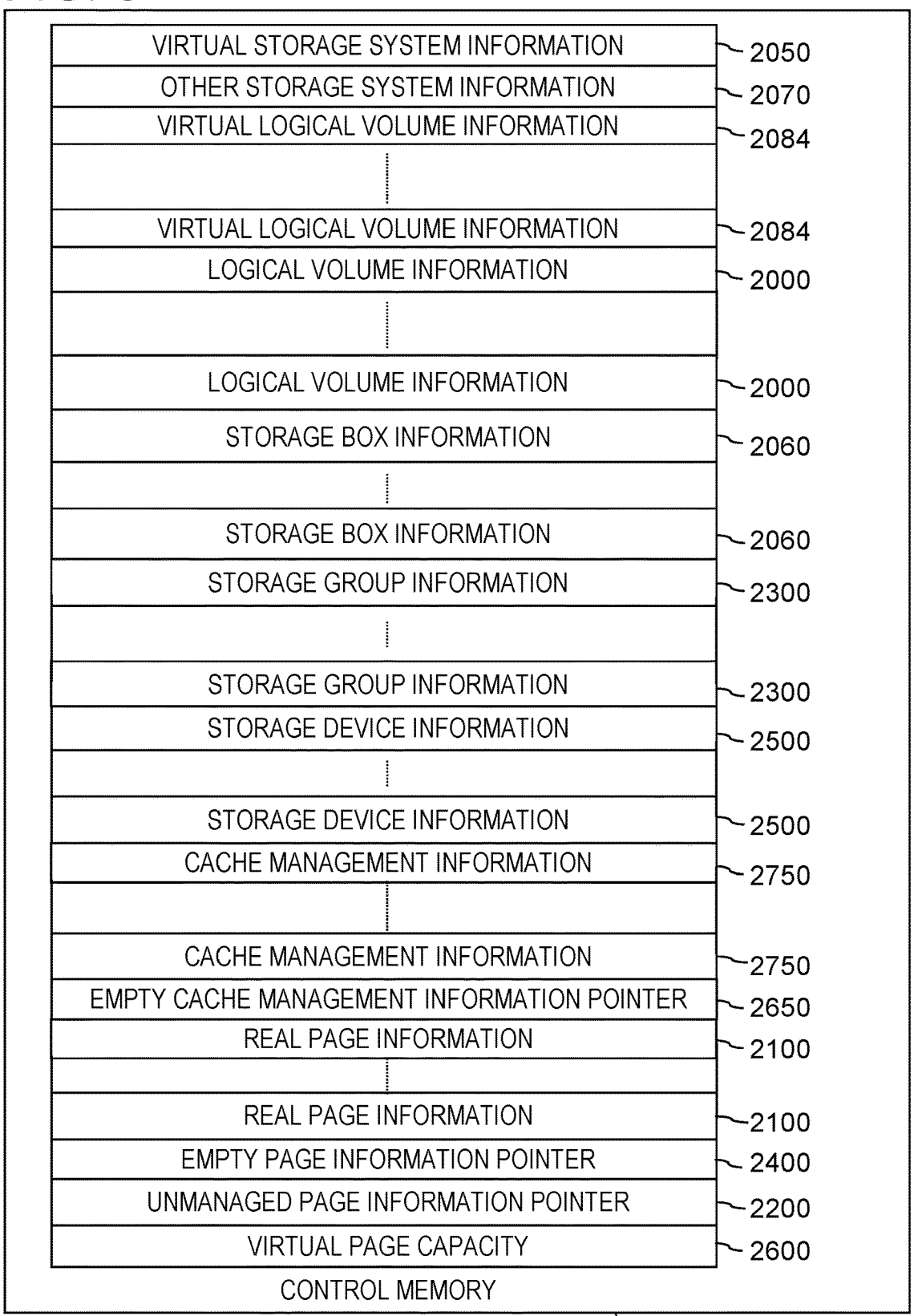
FIG. 5 is a configuration diagram of controller VM management information according to the embodiment.

FIG. 5 is a configuration diagram of the controller VM management information according to the embodiment.

The controller VM management information includes virtual storage system information 2050, other storage system information 2070, and one or more pieces of virtual logical volume information 2084, one or more pieces of logical volume information 2000, one or more pieces of storage box information 2060, one or more pieces of storage group information 2300, one or more pieces of storage device information 2500, one or more pieces of cache management information 2750, empty cache management information pointer 2650, one or more pieces of real page information 2100, an empty page management information pointer 2400, an unmanaged page information pointer 2200, and a virtual page capacity 2600. Each of these pieces of information will be described in detail below.

First, the virtual storage system information 2050 will be described.

Figure 6:
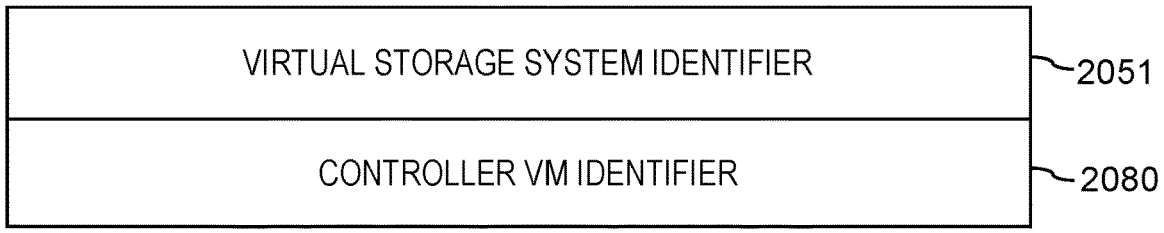
FIG. 6 is a configuration diagram of virtual storage system information according to the embodiment.

FIG. 6 is a configuration diagram of the virtual storage system information according to the embodiment.

The virtual storage system information 2050 is information on the virtual storage system 190, and includes a virtual storage system identifier 2051 and a controller identifier VM 2080. The virtual storage system identifier 2051 is an identifier of the virtual storage system 190 including a controller VM 100 (hereinafter, referred to as a relevant controller VM 100 in the description of the information of the control memory 220) having the control memory 220 which stores the virtual storage system information 2050. The controller VM identifier 2080 is an identifier of the relevant controller VM 100 on a server 110 (hereinafter, referred to as a relevant server 110 in the description of the information of the control memory 220) equipped with the relevant controller VM 100.

Next, the other storage system information 2070 will be described.

Figure 7:
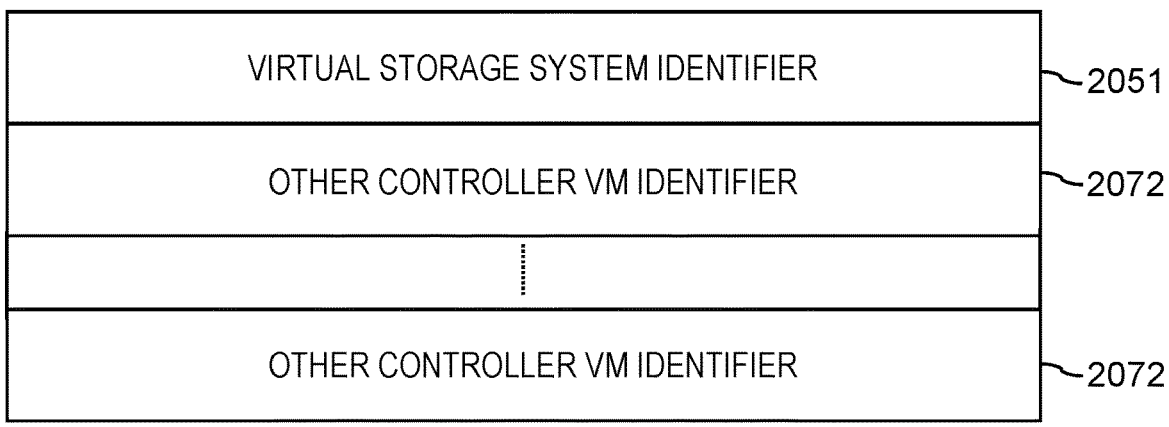
FIG. 7 is a configuration diagram of other storage system information according to the embodiment.

FIG. 7 is a configuration diagram of the other storage system information according to the embodiment.

The other storage system information 2070 includes a virtual storage system identifier 2051 and one or more other controller VM identifiers 2072. The virtual storage system identifier 2051 is the same as the virtual storage system identifier 2051 of the virtual storage system information 2050 in FIG. 6, and is an identifier of the virtual storage system 190 including the relevant controller VM 100. The other controller VM identifier 2072 is an identifier of each of the controller VMs 100 on the respective servers 100 included in the virtual storage system 190 including the relevant controller VM 100.

Next, the virtual logical volume information 2084 will be described.

Figure 8:
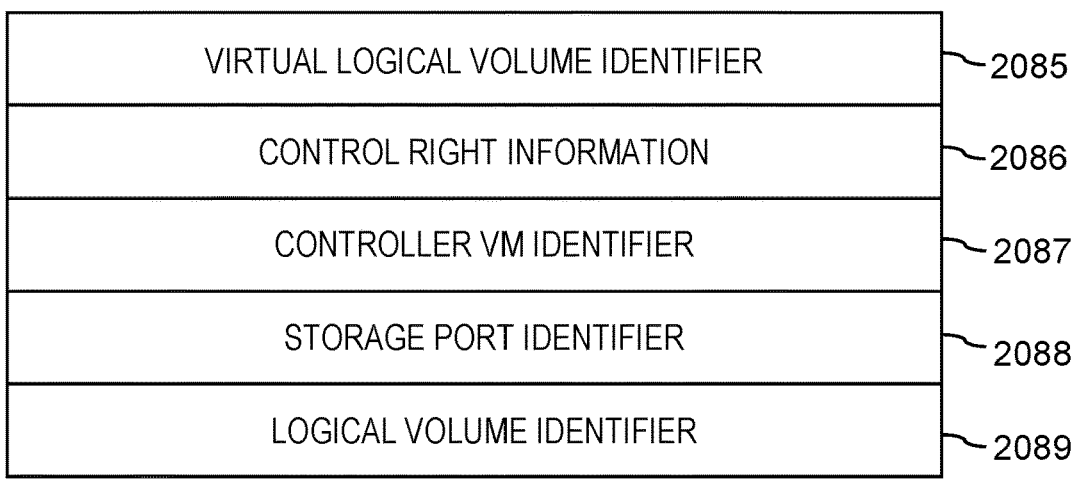
FIG. 8 is a configuration diagram of virtual logical volume information according to the embodiment.

FIG. 8 is a configuration diagram of the virtual logical volume information according to the embodiment.

The virtual logical volume information 2084 is information provided to correspond to a virtual logical volume and a logical volume. The virtual logical volume information 2084 includes a virtual logical volume identifier 2085, control right information 2086, a controller VM identifier 2087, a storage port identifier 2088, and a logical volume identifier 2089.

The virtual logical volume identifier 2085 is an identifier of a virtual logical volume (referred to as a corresponding virtual logical volume) corresponding to the virtual logical volume information 2084. In the present embodiment, any one of the controller VMs 100 has a right (control right) to perform read/write for the virtual logical volume. The control right information 2086 indicates whether the relevant controller VM 100 has the control right for the corresponding virtual logical volume. The controller VM identifier 2087 represents an identifier of the controller VM 100 that has the control right for the corresponding virtual logical volume when the relevant controller VM 100 does not have the control right for the corresponding virtual logical volume. The storage port identifier 2088 represents an identifier of the storage port 170 at the time of accessing the corresponding virtual logical volume. The logical volume identifier 2089 represents an identifier of a corresponding logical volume in the relevant controller VM 100 when the relevant controller VM 100 has the control right for the corresponding virtual logical volume and represents an identifier of a corresponding logical volume in the controller VM 100 having the control right when the relevant controller VM 100 does not have the control right.

Next, the logical volume information 2000 will be described.

FIG. 9 is a configuration diagram of the logical volume information according to the embodiment.

Before describing the logical volume information 2000, IO for data in the present embodiment will be described. In the present embodiment, a storage device to which the application VM 140 performs IO (read/write) of data is a virtual logical volume. The application VM 140 issues an IO request (read request or write request) that specifies an identifier of the virtual logical volume as a target of IO, a target address in the virtual logical volume, and a target data length of IO. When receiving the IO request from the application VM 140, the controller VM 100 recognizes an identifier of a corresponding logical volume based on the virtual logical volume information 2084. In the present embodiment, the identifier of the logical volume is information that is unique in the controller VM 100.

The logical volume information 2000 is information provided to correspond to each logical volume. The logical volume information 2000 includes a logical volume identifier 2001, a logical capacity 2002, a logical volume type 2005, a logical volume RAID type 2003, a real page pointer 2006, a first read count 2007, a first write count 2008, a second read count 2009, a second write count 2010, a LUN migrating flag 2015, a LUN migration source identifier 2016, a migration pointer 2017, a migration waiting flag 2018, a migrating flag for deactivation 2019, a migration source LUN for deactivation 2020, and a cache management pointer 2022.

The logical volume identifier 2001 indicates an identifier of a logical volume (referred to as a corresponding logical volume in the description of the logical volume information 2000) corresponding to the logical volume information 2000. The logical capacity 2002 is a logical capacity of the corresponding logical volume. The logical volume type 2005 represents a type of a logical volume. The logical volume RAID type 2003 indicates a type (RAID level) of RAID configured by the corresponding logical volume, for example, RAID0, RAID1, or the like. For example, when redundant data of the capacity of one unit is stored with respect to the capacity of N units as in RAID5, a specific numerical value of N is specified. However, as the logical volume RAID type 2003, it is not possible to specify any RAID level, but a RAID level associated with at least one RAID group needs to be specified.

One of features of the present embodiment is that the controller VM 100 has a capacity virtualization function. The capacity virtualization function is a function that allocates a page including an area to be written for the first time when a write request is made without allocating an actual storage area when a logical volume is defined. The logical volume is divided per page, and a space of the logical volume is called a virtual page, and an area actually allocated to the virtual page is called a real page. Therefore, the logical volume information 2000 has the real page pointers as many as a number obtained by dividing the logical capacity 2002 by a size of the virtual page, and sets an address of an allocated real page in a real page pointer when the real page is allocated to a virtual page.

For example, a unit of allocating a storage area is called a page in the capacity virtualization function. The logical volume is a logical storage device to which the application VM 140 performs read and write. The space of the logical volume is divided in units of virtual pages, and the storage area of the actual storage group is divided in units of real pages. In the capacity virtualization function, the storage capacity of the logical volume is made to appear larger than the actual capacity of a storage medium. Therefore, the number of virtual pages is generally larger than the number of real pages. In a case where the capacity virtualization function is realized, the real page is allocated when the controller VM 100 does not allocate a real page to a virtual page including an address for which write is instructed with a write request from the application VM 140. The virtual page capacity 2600 of the controller VM management information illustrated in FIG. 5 indicates the capacity of the virtual page. In the present embodiment, the virtual page capacity 2600 and the real page capacity are not always equal. This is because the capacity of the real page contains redundant data that varies depending on a RAID level. Therefore, the capacity of the real page is determined by a RAID level of a storage group to which the real page is allocated. For example, when data is written doubly as in RAID 1, the capacity of the real page is twice the virtual page capacity 2600. In addition, when redundant data of the capacity of a storage device of one unit is stored for the capacity of storage devices of N units as in RAID5, the capacity of the real page is the capacity of (N+1)/N of the virtual page capacity of 2600. In addition, the capacity equal to the virtual page capacity 2600 is the capacity of the real page when there is no redundancy as in RAID0. Although the virtual page capacity 2600 is common in the virtual storage system 190 in the present embodiment, the virtual page capacity 2600 may be different among the controller VMs 100. Note that each storage group is configured by, for example, RAID5 in the present embodiment, but may be configured at any RAID level.

Returning to the description of FIG. 9, the first read count 2007, the first write count 2008, the second read count 2009, and the second write count 2010 are pieces of information on the number of executions of a read process and a write process of the corresponding logical volume. In the present embodiment, when a read request or a write request for the corresponding logical volume is received, the first read count 2007 or the first write count 2008 is incremented. Further, at regular intervals, the first read count 2007 is copied to the second read count 2009, the first write count 2008 is copied to the second write count 2010, and the first read count 2007 and the first write count 2008 are set to zero. In this manner, the read count and the write count for a predetermined period are stored in the second read count 2009 and the second write count 2010 so that the performance characteristics of IO of the corresponding logical volume can be grasped. Note that the amount of read and write data may be measured and managed in addition to the read count and the write count. In the present embodiment, the logical volume is rearranged among the controller VMs 100 based on the information on the number of executions of the read process and the write process of the corresponding logical volume.

The LUN migrating flag 2015 is a flag indicating that the corresponding logical volume is being migrated. The LUN migration source identifier 2016 represents identifiers of the controller VM 100, a storage path 195, and the logical volume of the logical volume serving as a migration source when the corresponding logical volume is being migrated. The migration pointer 2017 indicates any block (which may be an address) to which a migration process (copy process) has progressed. The migration waiting flag 2018 indicates a state where the corresponding logical volume is waiting for migration. The migrating flag for deactivation 2019 indicates a state where a failure has occurred in another controller VM 100 has a failure and inherited data of the cache memory 210 and the control memory 220 of the controller VM 100 in which the failure has occurred is being copied.

The migration source LUN for deactivation 2020 indicates information set in the logical volume information 2000 of the logical volume which is a migration source, and indicates an identifier of the controller VM 100 that manages the logical volume of the migration source and an identifier of the logical volume of the migration source.

The cache management pointer 2022 represents whether the slot 21100 is allocated to each area, obtained by dividing the corresponding logical volume by the capacity corresponding to the slot 21100, is allocated to the slot 21100 (that is, stored in the cache memory 210). The cache management pointer 2022 is a pointer for the corresponding cache management information 2750 when the slot 2110 of the cache memory 210 is allocated, and is in a null state when the slot 21100 of the cache memory 210 is not allocated.

Next, the cache management information 2750 will be described.

Figure 10:
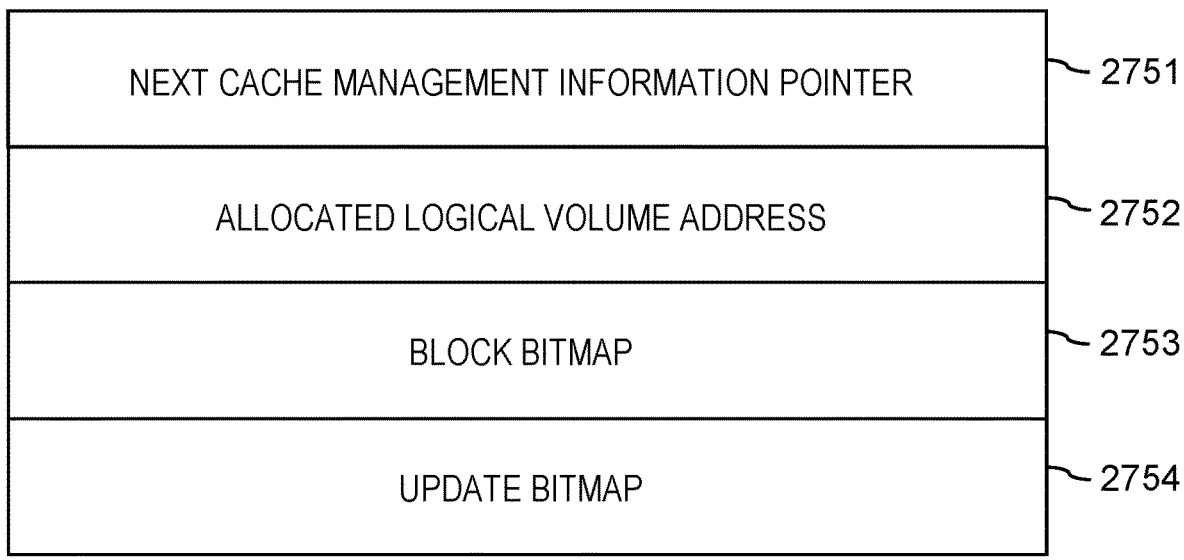
FIG. 10 is a configuration diagram of cache management information according to the embodiment.

FIG. 10 is a configuration diagram of the cache management information according to the embodiment.

The cache management information 2750 is information provided to correspond to each of the slots 21100 of the cache memory 210. The cache management information 2750 includes a next cache management information pointer 2751, an allocated logical volume address 2752, a block bitmap 2753, and an update bitmap 2754.

The next cache management information pointer 2751 is valid information in a slot in which no data is stored, and is a pointer indicating the cache management information 2750 corresponding to the next slot 21100 in which no data is stored. The allocated logical volume address 2752 indicates whether data stored in the slot 21100 corresponding to the cache management information 2750 is data of an area starting from which address of which logical volume. The block bitmap 2753 is a bitmap indicating a block (block is the minimum unit for read and write) stored in the cache memory 210 in an area of the slot 21100 for the cache management information 2750. The block bitmap 2753 has a bit corresponding to each block, and the bit of the block stored in the cache memory 210 is set to ON. The update bitmap 2754 is a bitmap indicating a block receiving a write request from the server 110 and storing data received from the server 110 in the cache memory 210, which is the block that has not been written to the storage device 160 yet. In the present embodiment, the update bitmap 2754 has a bit corresponding to each block, and the bit of the block that has not been written to the storage device 160 is set to ON.

Next, the empty cache management information management queue 2201 will be described.

Figure 11:
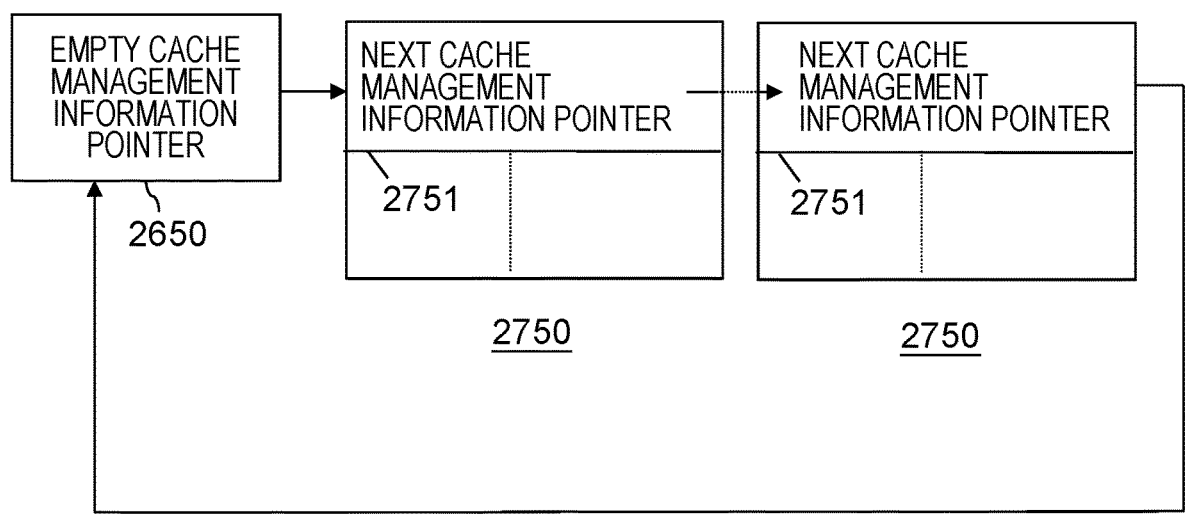
FIG. 11 is a diagram illustrating an empty cache management information management queue according to the embodiment.

FIG. 11 is a diagram illustrating the empty cache management information management queue according to the embodiment.

The empty cache management information management queue 2201 manages the cache management information 2750 corresponding to a slot (empty slot) in which no data is stored using the empty cache management information pointer 2650.

The empty cache management information pointer 2650 points to (indicates) the first cache management information 2750 corresponding to an empty slot. The first cache management information 2750 points to the cache management information 2750 corresponding to the next empty slot using the next cache management information pointer 2751 included in the first cache management information 2750. A next cache management information pointer 2751 of the cache management information 2750 corresponding to the last empty slot points to the empty cache management information pointer 2650. According to this empty cache management information management queue 2201, the cache management information 2750 corresponding to the empty slot can be sequentially traced from the empty cache management information pointer 2650, and the empty slot can be identified.

Next, the storage box information 2050 will be described.

Figure 12:
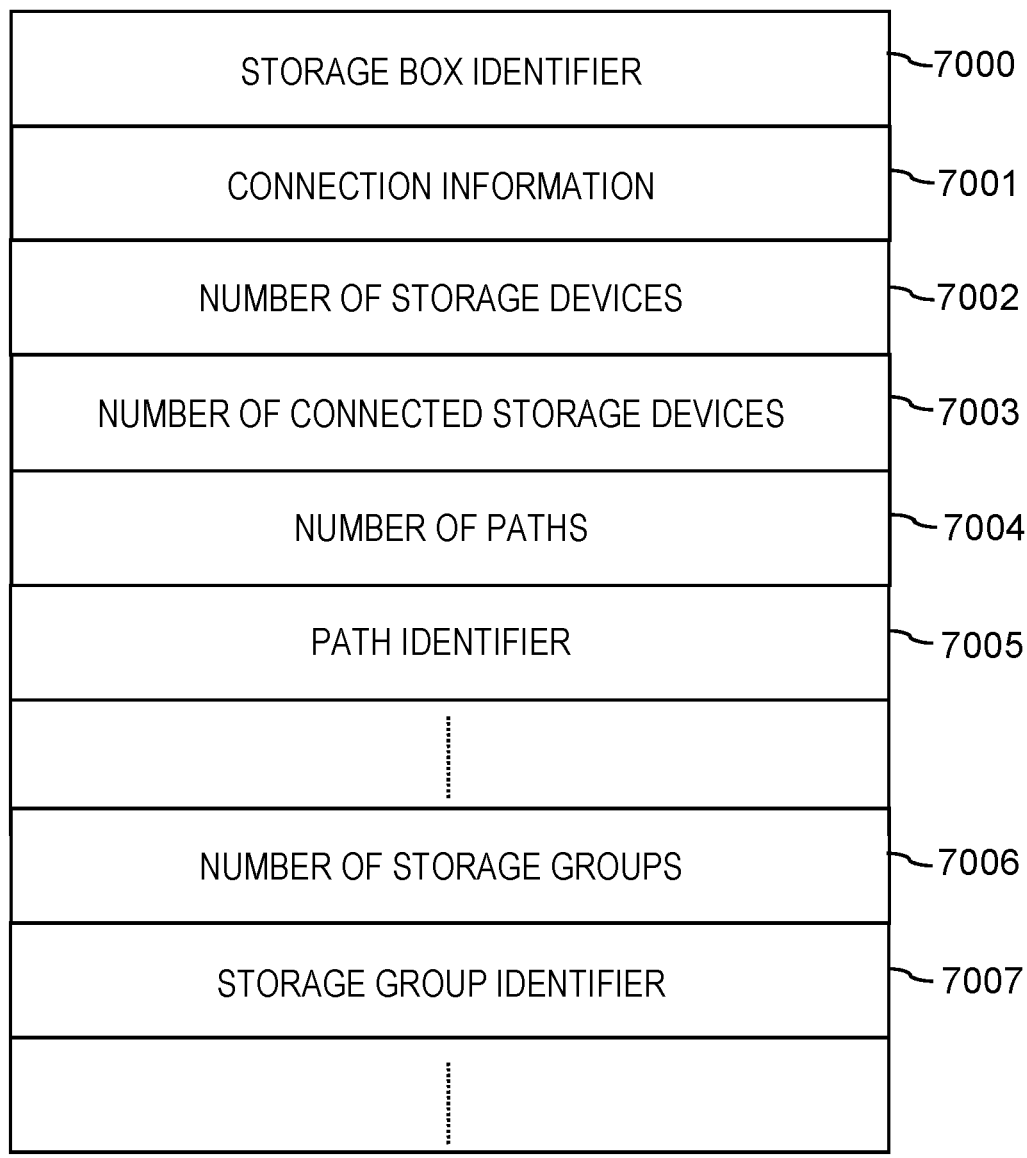
FIG. 12 is a configuration diagram of storage box information according to the embodiment.

FIG. 12 is a configuration diagram of the storage box information according to the embodiment.

The storage box information 2050 is information provided to correspond to each of the storage boxes 130. The storage box information 2050 includes a storage box identifier 7000, connection information 7001, the number of storage devices 7002, the number of connected storage devices 7003, the number of paths 7004, a path identifier 7005, the number of storage groups 7006, and a storage group identifier 7007.

The storage box identifier 7000 is an identifier of a storage box (referred to as a corresponding storage box in the description of the storage box information) 130 corresponding to the storage box information 2050. The connection information 7001 is information indicating whether the corresponding storage box 130 is connected to the relevant controller VM 100. The number of storage devices 7002 is the number of storage devices 160 that can be connected to the corresponding storage box 130. The number of connected storage devices 7003 is the number of storage devices 160 actually connected to the corresponding storage box 130. The number of paths 7004 is the number of paths of the corresponding storage box 130. The path identifier 7005 is an identifier for each path of the corresponding storage box 130. The number of storage groups 7006 is the number of storage groups included in the corresponding storage box 130. Although the storage group is constituted by the storage devices 160 in one storage box 130 in the present embodiment, the present invention is not limited thereto, and one storage group may be constituted by the storage devices 160 of different storage boxes 130. The storage group identifier 7007 is an identifier of a storage group included in the corresponding storage box 130.

Next, the storage group information 2300 will be described.

Figure 13:
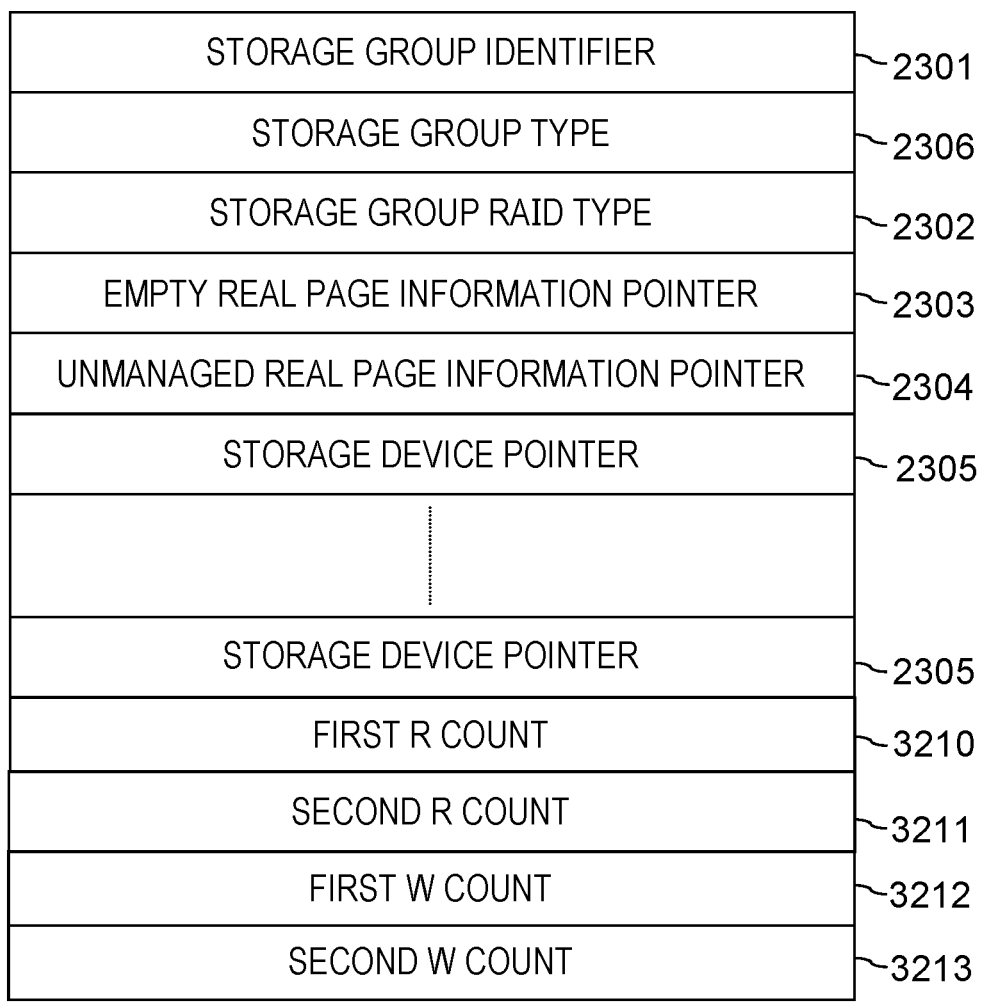
FIG. 13 is a configuration diagram of storage group information according to the embodiment.

FIG. 13 is a configuration diagram of the storage group information according to the embodiment.

The storage group information 2300 is information provided to correspond to each storage group. The storage group information 2300 includes a storage group identifier 2301, a storage group type 2306, a storage group RAID type 2302, an empty real page information pointer 2303, an unmanaged real page information pointer 2304, a storage device pointer 2305, a first R count 3210, a second R count 3211, a first W count 3212, and a second W count 3213.

The storage group identifier 2301 is an identifier of a storage group (referred to as a corresponding storage group in the description of the storage group information 2300) 2300 corresponding to the storage group information 2300. The storage group type 2306 is information indicating whether the corresponding storage group 2300 is constituted by the storage devices 160 or internal storage devices of the server 110. When the storage group type 2306 also includes an identifier of the storage box 130 including the storage devices 160 when the corresponding storage group includes the storage devices 160 of the storage box 130. The storage group RAID type 2302 is a RAID level of the corresponding storage group. The RAID level in the present embodiment is the same as that described when the logical volume RAID type 2003 of FIG. 9 is described.

The empty real page information pointer 2303 is a pointer indicating the start of real page management information of an empty real page (usable real page) whose allocation right is possessed by the relevant controller VM 100 among empty real pages which have not been allocated to virtual pages whose allocation right is possessed by the relevant controller VM 100 in the corresponding storage group 2300. The unmanaged real page information pointer 2304 is a pointer indicating the start of real page management information of an empty real page (unusable real page) whose allocation right is not possessed by the relevant controller VM 100 among the empty real pages which have not been allocated to virtual pages whose allocation right is possessed by the relevant controller VM 100 in the corresponding storage group 2300.

The first R count 3210, the second R count 3211, the first W count 3212, and the second W count 3212 are information regarding the number of executions of read process and write process in the corresponding storage group. In the present embodiment, when receiving a read request or a write request for the corresponding storage group, the first R count 3210 or the first W count 3212 is incremented according to the received request. In addition, the first R count 3210 is copied to the second R count 3211, the first W count 3212 is copied to the second W count 3213, and the first R count 3210 and the first W count 3212 are set to zero at predetermined intervals. As a result, the read count and the write count at predetermined intervals are stored in the second R count 3211 and the second W count 3213, respectively, and the performance characteristics of the corresponding storage group can be grasped with these read count and right count. In addition to the count related to IO, the amount of data related to IO may be measured and stored in the storage group information 2300. In the present embodiment, the logical volume is rearranged among the controller VMs 100 by using this information.

Next, the real page information 2100 will be described.

Figure 14:
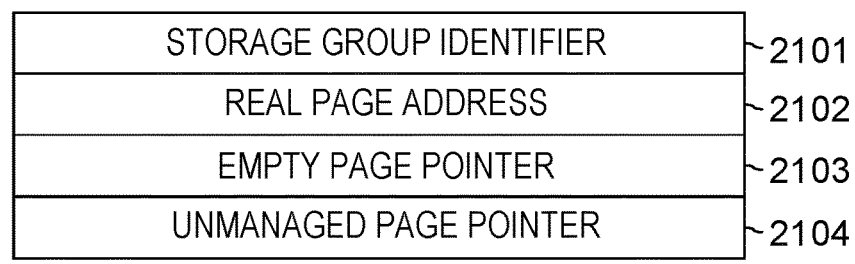
FIG. 14 is a configuration diagram of real page information according to the embodiment.

FIG. 14 is a configuration diagram of the real page information according to the embodiment.

The real page information 2100 is information provided to correspond to each real page. The real page information 2100 includes a storage group identifier 2101, a real page address 2102, an empty page pointer 2103, and an unmanaged real page pointer 2104.

The storage group identifier 2101 indicates an identifier of a storage group to which a real page (referred to as a corresponding real page) corresponding to the real page information is allocated. The real page address 2102 is information indicating any relative address to which the corresponding real page is allocated in the storage group corresponding to the storage group identifier 2101. The empty page pointer 2103 is a valid value when the corresponding real page is not allocated to a virtual page, that is, is an empty page. In this case, the empty page pointer 2103 points to the real page information 2100 corresponding to the next real page to which the virtual page is not allocated and of which allocation right is possessed by the relevant controller VM 100 in the storage group corresponding to the storage group identifier 2101. When the corresponding real page is allocated to the virtual page, the empty page pointer 2103 has a null value. In the present embodiment, there is a real page whose allocation right is not possessed by the relevant controller VM 100. The unmanaged real page pointer 2104 points to the real page information 2100 corresponding to the next real page of which allocation right is not possessed by the relevant controller VM 100 and which is not allocated to the virtual page. In the case of the real page information 2100 corresponding to the next real page for which the allocation right is possessed, the unmanaged real page pointer 2104 has a null value.

Next, the empty page information management queue 2900 will be described.

Figure 15:
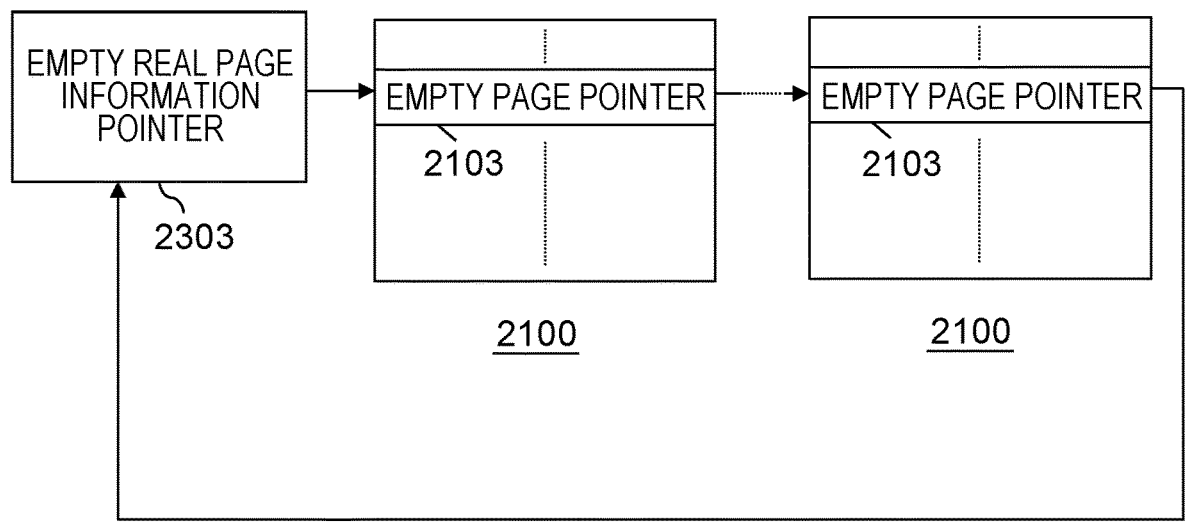
FIG. 15 is a diagram illustrating an empty page information management queue according to the embodiment.

FIG. 15 is a diagram illustrating the empty page information management queue according to the embodiment.

The empty page information management queue 2900 manages the real page information 2100 corresponding to an empty real page using the empty real page information pointer 2303. Here, the empty page information pointer 2303 is information provided for each storage group. In addition, the empty real page means a real page that is not allocated to a virtual page.

The empty real page information pointer 2303 points to (indicates) the real page information 2100 corresponding to a first empty real page. The first real page information 2100 points to the real page information 2100 corresponding to the next empty real page using the empty page pointer 2103 included in the first real page information 2100. The empty page pointer 2103 of the real page information 2100 corresponding to the last empty real page points to the empty real page information pointer 2303. The empty page pointer 2103 of the last real page information 2100 may have a null value without pointing to the empty real page information pointer 2303.

When receiving a write request for a virtual page to which no real page is allocated, the controller VM 100 searches for an empty real page based on the empty real page information pointer 2303, which corresponds to any storage group corresponding to the logical volume RAID type 2003 and the real page pointer 2006 (for example, the storage group with the largest number of empty real pages in the corresponding storage group), and allocates the searched empty real page to the virtual page.

Next, the unmanaged real page information management queue 2910 will be described.

Figure 16:
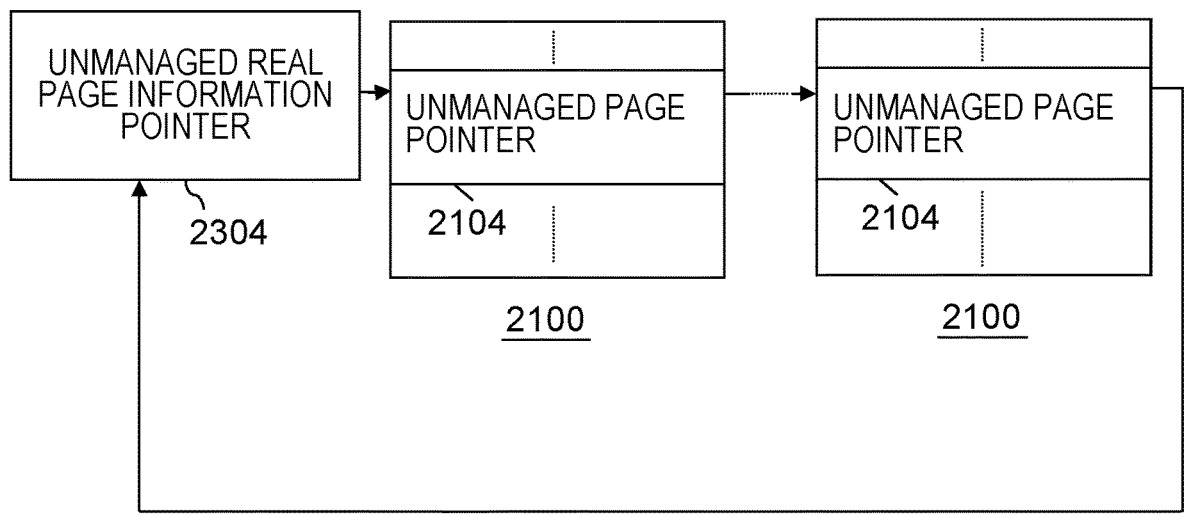
FIG. 16 is a diagram illustrating an unmanaged real page information management queue according to the embodiment.

FIG. 16 is a diagram illustrating the unmanaged real page information management queue according to the embodiment.

The unmanaged real page information management queue 2910 manages the real page information 2100 corresponding to an unmanaged real page using the unmanaged real page information pointer 2304. Here, the unmanaged real page information pointer 2304 is information provided for each storage group. In the present embodiment, there is a real page whose allocation right is not possessed by the relevant controller VM 100. The unmanaged real page means a real page whose allocation right is not possessed by the relevant controller VM 100.

The unmanaged real page information pointer 2304 points to (indicates) the real page information 2100 corresponding to a first unmanaged real page. The first real page information 2100 points to the real page information 2100 corresponding to the next unmanaged real page using the unmanaged real page pointer 2104 included in the first real page information 2100. The unmanaged real page pointer 2104 of the real page information 2100 corresponding to the last unmanaged real page points to the unmanaged real page information pointer 2304. The unmanaged real page pointer 2104 of the last real page information 2100 may have a null value without pointing to the unmanaged real page information pointer 2304.

When the storage box 130 is added, the controller VM 100 calculates the number of real pages based on the capacity and the like in cooperation with the other controllers VM 100, generates necessary real page information, and determines any controller VM 100 that has the allocation right for each real page. Each of the controller VMs 100 connects the real page information 2100 of a real page whose allocation right is possessed by the relevant controller VM 100 to the empty page information queue 2900 of the corresponding storage group, and connects the real page information 2100 of a real page whose allocation right is not possessed by the relevant controller VM 100 to the unmanaged real page information queue 2910 of the corresponding storage group.

Next, the storage device information 2500 will be described.

Figure 17:
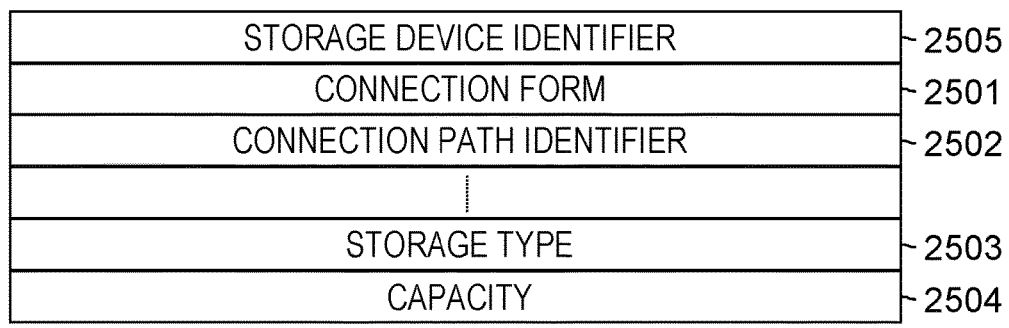
FIG. 17 is a configuration diagram of storage device information according to the embodiment.

FIG. 17 is a configuration diagram of the storage device information according to the embodiment.

The storage device information 2500 is information provided to correspond to each storage device. The storage device information 2500 includes a storage device identifier 2500, a connection form 2501, a connection path identifier 2502, a storage type 2503, and a capacity 2504.

The storage device identifier 2500 is an identifier of a storage device 160 (referred to as a corresponding storage device) corresponding to the storage device information 2500. The connection form 2501 indicates whether the corresponding storage device is the storage device 160 of the storage box 130 or the internal storage device of the server 110. The connection path 2502 indicates an identifier of a connected path in the case of the storage device 160 of the storage box 130. The storage type 2503 indicates a type of a storage medium, such as an HDD and a flash memory, in the corresponding storage device. The capacity 2504 indicates a capacity of the corresponding storage device. In the present embodiment, the storage types 2503 and the capacities 2504 of the storage devices constituting the storage group are equal.

Next, processing operations executed by the controller VM 100 and the VM management unit 150 using the above-described various types of management information will be described.

The controller VM 100 and the VM management unit 150 configure various functional units as a processor of the server 110 executes a program stored in the memory of the server 110.

Figure 18:
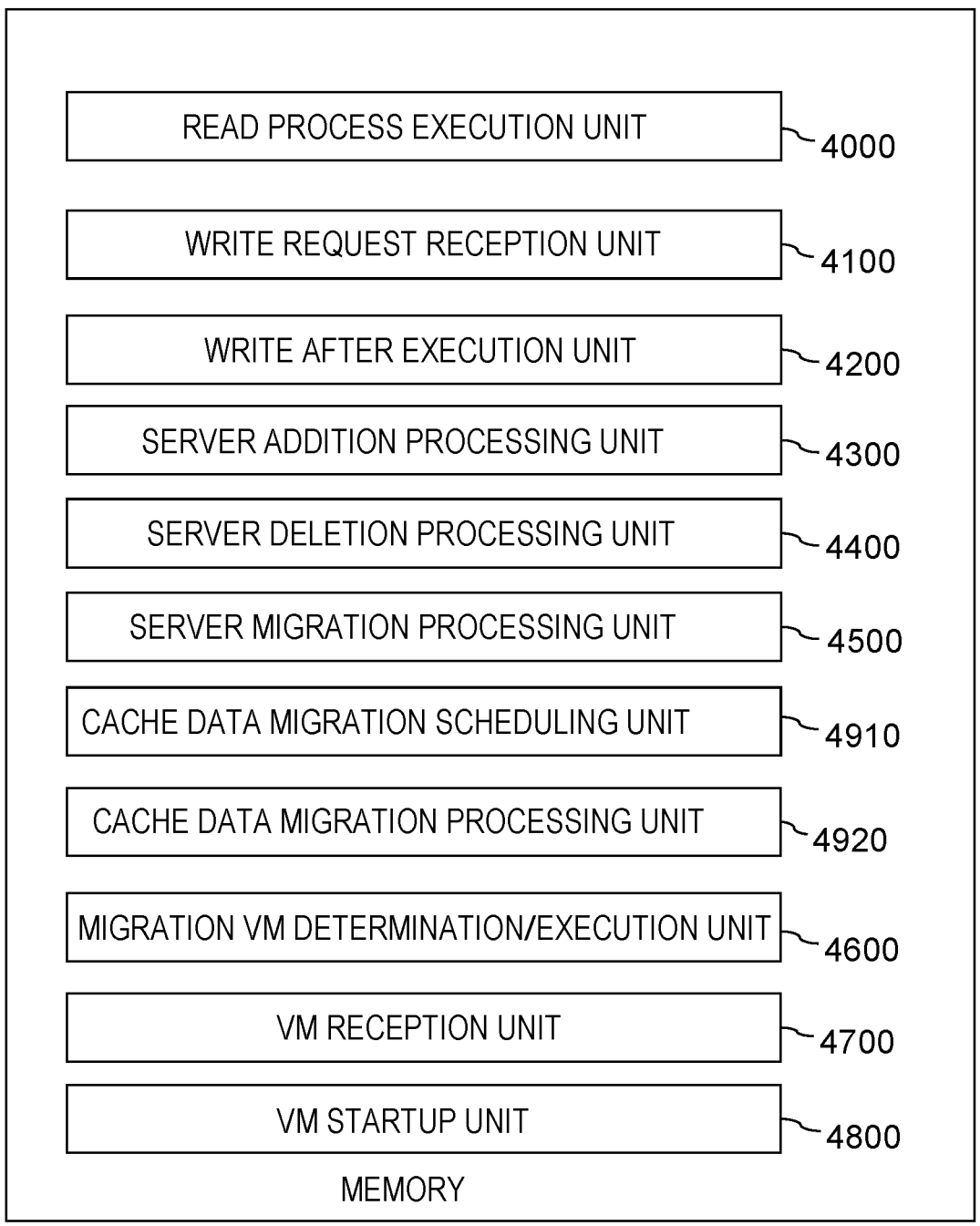
FIG. 18 is a configuration diagram of a functional unit configured by a management program according to the embodiment.

FIG. 18 is a configuration diagram of a functional unit configured by a management program according to the embodiment.

A memory of the server 110 includes programs to configure a read processing execution unit 4000, a write request reception unit 4100, and a write after execution unit 4200, a server addition processing unit 4300, a server deletion processing unit 4400, a server migration processing unit 4500, a cache data migration scheduling unit 4910, and a cache data migration processing unit 4920, which realize functions of the controller VM 100, and programs to configure a migration VM determination/execution unit 4600, a VM reception unit 4700, and a VM startup unit 4800 which realize functions of the VM management unit 150. Note that processing operations of the respective functional units will be described later.

First, a read process of the read processing execution unit 4000 will be described.

Figure 19:
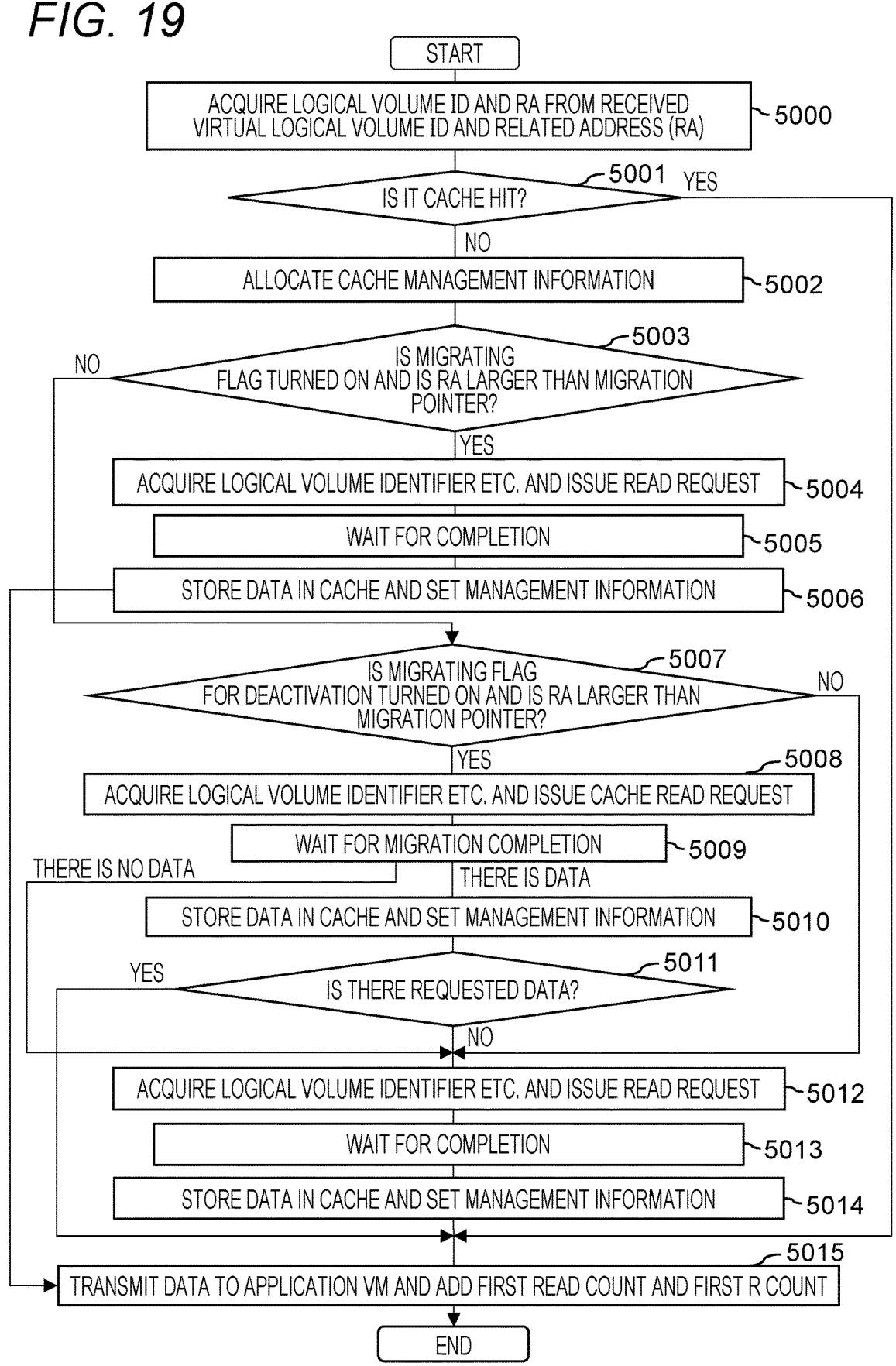
FIG. 19 is a flowchart of a read process according to the embodiment.

FIG. 19 is a flowchart of the read process according to the embodiment.

The read process is executed when the controller VM 100 receives a read request from the application VM 140.

Step 5000: The read processing execution unit 4000 of the controller VM 100 converts a virtual logical volume and an address (related address) of the read request specified in the received read request to a logical volume and an address of the read request on the logical volume (read request address or related address: RA) based on the virtual logical volume information 2084, and acquires the logical volume information 2000 corresponding to this logical volume. Here, the logical volume obtained by conversion is referred to as a target logical volume.

Step 5001: The read processing execution unit 4000 checks whether data specified in the read request hits in the cache memory 210 based on the cache management pointer 2022, the block bitmap 2753 of the cache management information 2750, and the like, from the address of the received read request. As a result, if it is a cache miss (Step 5001: N), the read processing execution unit 4000 advances the processing to Step 5002. On the other hand, if it is a cache hit (Step 5001: Y), the read processing execution unit 4000 advances the processing to Step 5015.

Step 5002: The read processing execution unit 4000 sets the first cache management information 2750 indicated by the empty cache management information pointer 2650 to the cache management pointer 2022 corresponding to the related address of the logical volume information 2000 corresponding to the target logical volume, thereby allocating the slot 21100. Further, the read processing execution unit 4000 sets an identifier and an address of a target logical volume in the allocated logical volume address 2752 of the cache management information 2750.

Step 5003: The read processing execution unit 4000 checks whether the LUN migrating flag 2015 of the logical volume information 2000 corresponding to the target logical volume is turned on. If the LUN migrating flag 2015 is turned off (Step 5003: N), this indicates that the migration of the target logical volume has not been executed, the read processing execution unit 4000 advances the processing to Step 5007. On the other hand, if the LUN migrating flag 2015 is turned on, the read processing execution unit 4000 further compares the address specified in the read request with the migration pointer 2017 (that is, indicating an address where copying is currently completed after starting copying from the first target logical volume), and advances the processing to Step 5004 since the read request address indicates an address where the migration has not been executed if the read request address is greater than the migration pointer (Step 5003: Y), and advances the processing to Step 5007 since the address specified by the read request indicates an access to an address where the migration has already been executed if the read request address is not greater than the migration pointer 2017 (Step 5003: N).

Step 5004: The read processing execution unit 4000 specifies a storage path stored in the migration source LUN identifier 2016, an identifier of a logical volume, and the address specified in the read request to issue a read request to the controller VM 100 stored in the migration source LUN identifier 2016. Note that there is a case where the controller VM 100 to which the read request is issued is the own controller VM 100. In this case, the read processing execution unit 4000 recognizes the corresponding logical volume information 2000 based on the identifier of the logical volume, and recognizes the corresponding storage group by referring to the real page pointer 2006 of the corresponding address in the logical volume information 2000, recognizes the storage device 160 including the requested data and its address based on the RAID level and the like, and issues a read request to the corresponding storage device 160.

Step 5005: The read processing execution unit 4000 waits for completion of the read request.

Step 5006: The read processing execution unit 4000 receives data in response to the read request and stores the received data in the cache memory 210. Further, the read processing execution unit 4000 sets a bit of the block bitmap 2753 corresponding to the received data, and then, advances the processing to Step 5015.

Step 5007: The read processing execution unit 4000 checks the migrating flag for deactivation 2019. If the migrating flag for deactivation 2019 is turned off (Step 5007: N), the read processing execution unit 4000 advances the processing to Step 5012. On the other hand, if the migrating flag for deactivation 2019 is turned on, this indicates a state where the relevant controller VM is copying a cache or a control memory due to occurrence of a failure in the other controller VM. Thus, the read processing execution unit 4000 further advances the processing to Step 5008 when the read request address is greater than the migration pointer 2017 (Step 5007: Y), and advances the processing to Step 5012 when the read request address is not greater than the migration pointer 2017 (Step 5007: N).

Step 5008: The read processing execution unit 4000 specifies a storage path and a logical volume identifier stored in the migration source LUN for deactivation 2020 and an address specified in a write request and issues a request (cache read request) to read data from a slot of the cache memory 210 to the controller VM 100 stored in the migration source LUN for deactivation 2020.

Step 5009: The read processing execution unit 4000 waits for completion of the cache read request. The read processing execution unit 4000 advances the processing to Step 5012 when receiving a response to the cache read request that there is no data in the requested slot, and advances the processing to Step 5010 when receiving target data of the cache read request.

Step 5010: The read processing execution unit 4000 stores the received data in the cache memory 210. Further, the read processing execution unit 4000 sets a bit of the block bitmap 2753 corresponding to the received data, and then, advances the processing to Step 5011.

Step 5011: The read processing execution unit 4000 refers to the set block bitmap 2753 and checks whether the requested data is stored in the cache memory 210. As a result, if the requested data exists in the cache memory 210 (Step 5011: Y), the read processing execution unit 4000 advances the processing to Step 5015. On the other hand, if the requested data does not exist in the cache memory 210 (Step 5011: N), the read processing execution unit 4000 advances the processing to Step 5012.

Step 5012: the read processing execution unit 4000 recognizes the corresponding logical volume information 2000 based on the identifier of the logical volume, and recognizes the corresponding storage group by referring to the real page pointer 2006 of the corresponding address in the logical volume information 2000, recognizes the storage device 160 including the requested data and its address based on the RAID level and the like, and issues a read request to the corresponding storage device 160.

Step 5013: The read processing execution unit 4000 waits for completion of the read request.

Step 5014: The read processing execution unit 4000 receives data in response to the read request and stores the received data in the cache memory 210. Further, the read processing execution unit 4000 sets a bit of the block bitmap 2753 corresponding to the received data, and then, advances the processing to Step 5015.

Step 5015: The read processing execution unit 4000 transfers the requested data to the application VM 140. Next, the read processing execution unit 4000 increments each of the first read count 2007 of the target logical volume and the first R count 3210 of the storage group information 2300 of the storage group corresponding to the target logical volume by one, and completes the process.

Next, a write reception process of the write request reception unit 4100 will be described.

Figure 20:
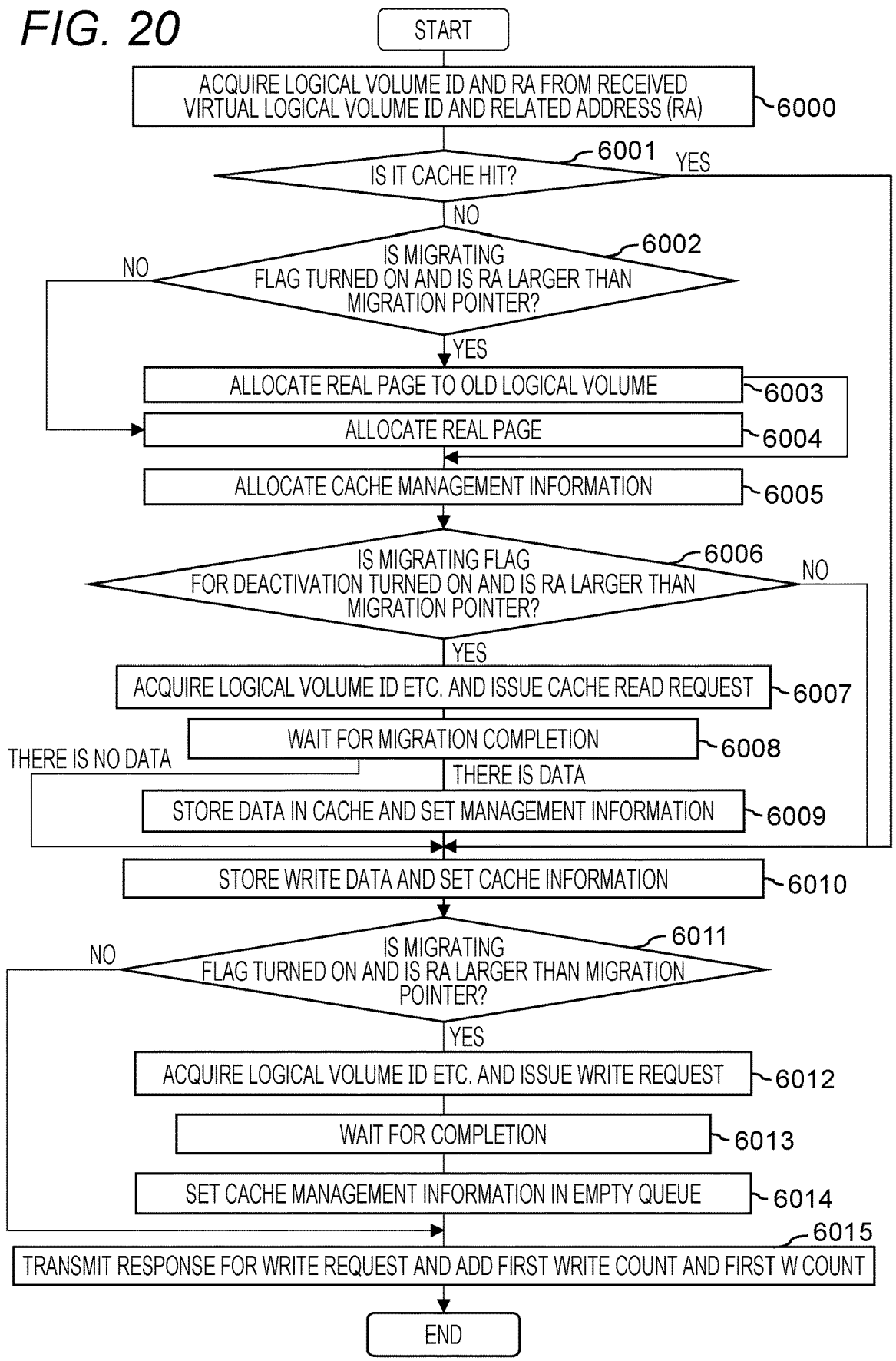
FIG. 20 is a flowchart of a write reception process according to the embodiment.

FIG. 20 is a flowchart of the write reception process according to the embodiment. The write reception process is executed when the controller VM 100 receives a write request from the application VM 140.

Step 6000: The write reception processing unit 4100 of the controller VM 100 converts a virtual logical volume and an address (related address) of the write request specified in the received write request to a logical volume and an address of the write request on the logical volume (related address: RA) based on the virtual logical volume information 2084, and acquires the logical volume information 2000 corresponding to this logical volume. Here, the logical volume obtained by conversion is referred to as a target logical volume.

Step 6001: The write reception processing unit 4100 checks whether data specified in the write request hits in the cache memory 210 based on the cache management pointer 2022, the block bitmap 2753 of the cache management information 2750, and the like, from the address of the received write request. As a result, if it is a cache miss (Step 6001: N), the write reception execution unit 4100 advances the processing to Step 6002. On the other hand, if it is a cache hit (Step 6001: Y), the write reception processing unit 4100 advances the processing to Step 6010.

Step 6002: The write reception execution unit 4100 checks whether the LUN migrating flag 2015 of the logical volume information 2000 corresponding to the target logical volume is turned on. If the LUN migrating flag 2015 is turned off (Step 6002: N), the write reception execution unit 4100 advances the processing to Step 6004. On the other hand, if the LUN migrating flag 2015 is turned on, the write reception execution unit 4100 further compares the write request address with the migration pointer 2017, advances the processing to Step 6003 if the write request address is greater than the migration pointer 2017 (Step 6002: Y), and advances the processing to Step 6004 if the write request address is not greater than the migration pointer 2017 (Step 6002: N).

Step 6003: The write reception execution unit 4100 refers to the real page pointer 2006 of the logical volume information 2000 corresponding to the logical volume if a migration source logical volume is the logical volume of the relevant controller VM 100, selects an appropriate storage group if no real page is allocated, identifies the real page information 2100 of an empty real page from the empty real page information pointer 2303 of the storage group information 2300 corresponding to the storage group, and allocates the empty real page of the identified real page information 2100. Thereafter, the write reception execution unit 4100 advances the processing to Step 6005.

Step 6004: The write reception execution unit 4100 refers to the real page pointer 2006 of the logical volume information 2000 corresponding to the logical volume if the corresponding logical volume is the logical volume of the relevant controller VM 100, selects an appropriate storage group if no real page is allocated, specifies the real page information 2100 of an empty real page from the empty real page information pointer 2303 of the storage group information 2300 corresponding to the storage group, and allocates the empty real page of the specified real page information 2100.

Step 6005: The write reception execution unit 4100 sets the first cache management information 2750 of the empty cache management information pointer 2650 to the cache management pointer 2022 of the logical volume information 2000 corresponding to the target logical volume, thereby allocating the slot 21100 to the target logical volume. Further, the write reception execution unit 4100 sets an identifier of the corresponding logical volume and an address for write to the allocated logical volume address 2752 of the slot management information 2750.

Step 6006: The write reception processing unit 4100 checks the migrating flag for deactivation 2019. If the migrating flag for deactivation 2019 is turned off (Step 6006: N), the write reception processing unit 4100 advances the processing to Step 6010. On the other hand, if the migrating flag for deactivation 2019 is turned on, the write reception processing unit 4100 further advances the processing to Step 6007 if the write request address is greater than the migration pointer 2017 (Step 6006: Y), and advances the processing to Step 6010 if the write request address is not greater than the migration pointer 2017 (Step 6006: N).

Step 6007: The write reception processing unit 4100 specifies a storage path and a logical volume identifier stored in the migration source LUN for deactivation 2020 and an address specified in a write request and issues a request (cache read request) to read data from a slot of the cache memory 210 to the controller VM 100 stored in the migration source LUN for deactivation 2020.

Step 6008: The write reception processing unit 4100 waits for completion of the cache read request. The write reception processing unit 4100 advances the processing to Step 6010 when receiving a response to the cache read request that there is no data in the requested slot, and advances the processing to Step 6009 when receiving target data of the cache read request.

Step 6009: The write reception processing unit 4100 sets bits of the block bitmap 2753 and the update bitmap 2754 corresponding to the received data, and stores the received data in the cache memory 210. Thereafter, the processing proceeds to Step 6010.

Step 6010: The write reception processing unit 4100 receives write data from the application VM 140 and stores the write data in the cache 210. Thereafter, the write reception processing unit 4100 sets bits of the block bitmap 2753 and the update bitmap 2754 of the cache management information 2750 corresponding to the received data.

Step 6011: The write reception processing unit 4100 checks whether the LUN migrating flag 2015 of the logical volume information 2000 of the corresponding logical volume is turned on. If the LUN migrating flag 2015 is turned off, the write reception processing unit 4100 advances the processing to Step 6015. On the other hand, if the LUN migrating flag 2015 is turned on, the write reception processing unit 4100 further compares the write request address with the migration pointer 2017, advances the processing to Step 6012 if the write request address is greater than the migration pointer 2017 (Step 6011: Y), and advances the processing to Step 6015 if the write request address is not greater than the migration pointer 2017 (Step 6011: N).

Step 6012: The write reception processing unit 4100 checks whether the controller VM 100 stored in the migration source LUN identifier 2016 is the relevant controller VM 100. If the controller VM 100 stored in the migration source LUN identifier 2016 is not the relevant controller VM 100, the write reception processing unit 4100 specifies a controller VM 100, a storage path, and a logical volume identifier stored in the migration source LUN identifier 2016 and an address specified in a write request to issue the write request so as to write the data received in the write request, and transmits the data stored in the cache 210.

Step 6013: The write reception processing unit 4100 waits for completion of the write request.

Step 6014: When the write request is completed, the write reception processing unit 4100 causes the empty cache management information pointer 2650 to indicate the cache management information 2750 corresponding to the written data.

Step 6015: The write reception processing unit 4100 reports the completion of the write request to the application VM 140, increments the first write count 2008 of the logical volume information 2000 of the target logical volume and the first W count 3212 of the storage group information 2300 of the storage group corresponding to the target logical volume by one, and completes the process.

Next, a write after process of the write after execution unit 4200 will be described.

Figure 21:
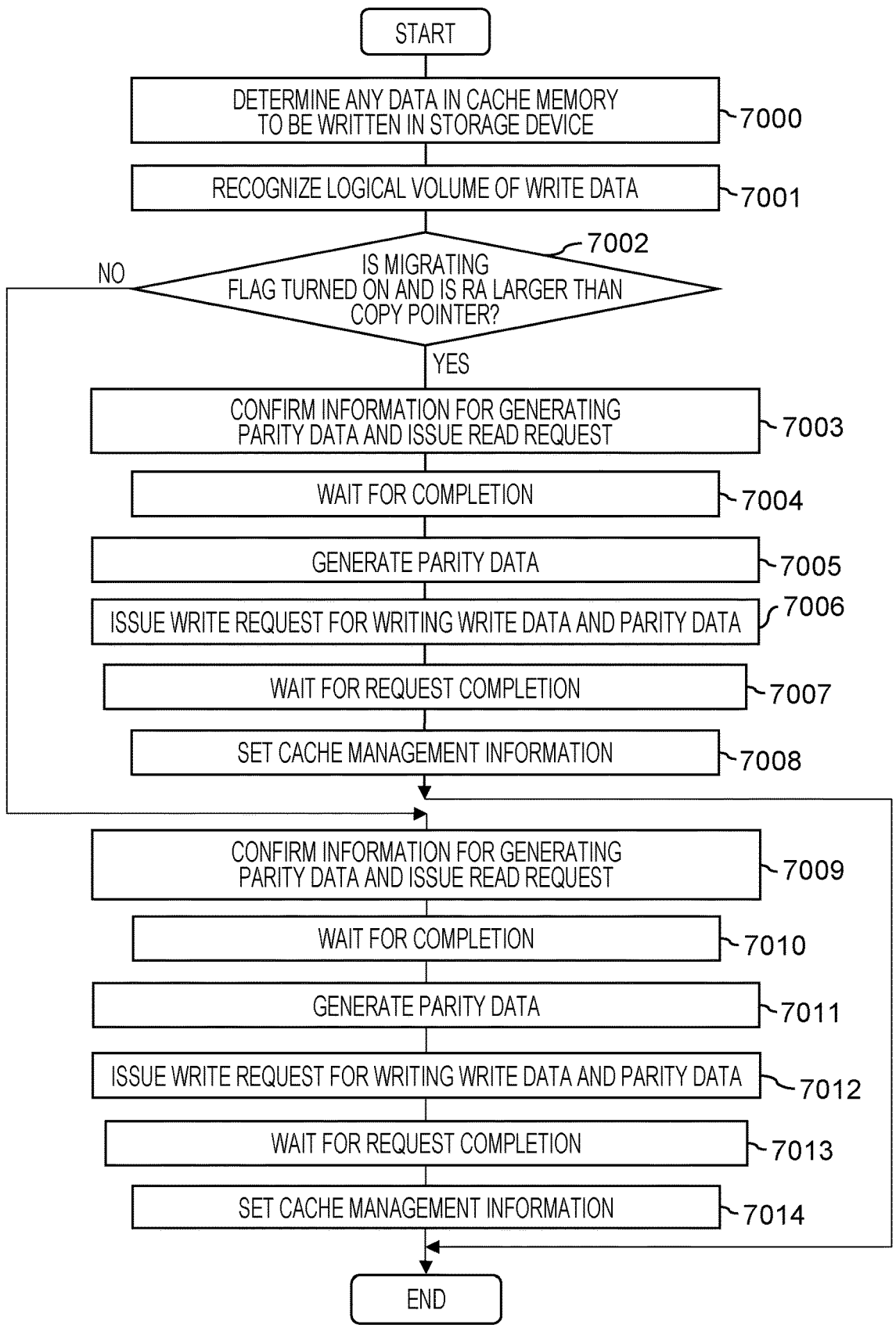
FIG. 21 is a flowchart of a write after process according to the embodiment.

FIG. 21 is a flowchart of the write after process according to the embodiment. The write after process is appropriately executed at an arbitrary timing.

Step 7000: The write after execution unit 4200 searches the cache management information 2750 to find the cache management information 2750 in which the update bitmap 2754 is turned on.

Step 7001: The write after execution unit 4200 confirms the allocated logical volume address 2752 of the found cache management information 2750 to recognize a logical volume corresponding to a slot corresponding to the cache management information 2750. Here, the recognized logical volume is referred to as a target logical volume in the write after process.

Step 7002: The write after execution unit 4200 checks whether the LUN migrating flag 2015 of the logical volume information 2000 corresponding to the target logical volume is turned on. If the LUN migrating flag 2015 is turned off (Step 7002: N), the write after execution unit 4200 advances the processing to Step 7009. On the other hand, if the LUN migrating flag 2015 is turned on, the write after execution unit 4200 advances the processing to Step 7003 if the controller VM 100 in the migration source logical volume 2016 is the relevant controller VM 100 and an address of a logical volume is greater than the migration pointer 2017 as a result of the comparison between the address of the logical volume corresponding to the cache management information 2750 and the migration pointer 2017, (Step 7002: Y), and advances the processing to Step 7009 if the address of the logical volume is not greater than the migration pointer 2017 (Step 7002: N).

Step 7003: The write after execution unit 4200 recognizes the logical volume information 2000 corresponding to this logical volume based on an identifier of the logical volume stored in the LUN migration source identifier 2016. In addition, the write after execution unit 4200 recognizes the real page pointer 2006 and recognizes an address for write. Further, the write after execution unit 4200 recognizes the storage device 160 and its address to read information required to generate redundant data (parity data) corresponding to slot data based on the logical volume RAID type 2003 and the like, and issues a read request to the recognized storage device 160.

Step 7004: The write after execution unit 4200 waits for completion of read according the read request.

Step 7005: The write after execution unit 4200 generates redundant data using the data read according to the read request.

Step 7006: The write after execution unit 4200 recognizes the storage device 160 to which data of a block corresponding to a bit indicating that the update bitmap 2754 has been updated and the generated redundant data need to be stored, and its address, and issues a write request to the recognized storage device 160.

Step 7007: The write after execution unit 4200 waits for completion of write according to the write request.

Step 7008: The write after execution unit 4200 sets a bit of the update bitmap 2754 corresponding to the block for which write has been executed to off, and then, ends the process.

Step 7009: The write after execution unit 4200 recognizes the logical volume information 2000 corresponding to this logical volume based on an identifier of the target logical volume. In addition, the write after execution unit 4200 recognizes the real page pointer 2006 and recognizes an address for write. Further, the write after execution unit 4200 recognizes the storage device 160 and its address to read information required to generate redundant data (parity data) corresponding to slot data based on the logical volume RAID type 2003 and the like, and issues a read request to the recognized storage device 160.

Step 7010: The write after execution unit 4200 waits for completion of read according to the read request.

Step 7011: The write after execution unit 4200 generates redundant data using the data read according to the read request.

Step 7012: The write after execution unit 4200 recognizes the storage device 160 to which data of a block corresponding to a bit indicating that the update bitmap 2754 has been updated and the generated redundant data need to be stored, and its address, and issues a write request to the recognized storage device 160.

Step 7013: The write after execution unit 4200 waits for completion of write according to the write request.

Step 7014: The write after execution unit 4200 sets a bit of the update bitmap 2754 corresponding to the block for which write has been executed to off, and then, ends the process.

Next, a server addition process executed when a new server 110 is added will be described. Here, in the description of this process, the server 110 to be added is referred to as an additional server (second server). Note that a situation where the new server 110 is added is applied as an example of a case where a predetermined situation occurs in which an application VM provided in a migration source server is migrated to a predetermined migration destination server, or a situation where a server configuration of the compound storage system is changed, but other examples will be described later.

Figure 22A:
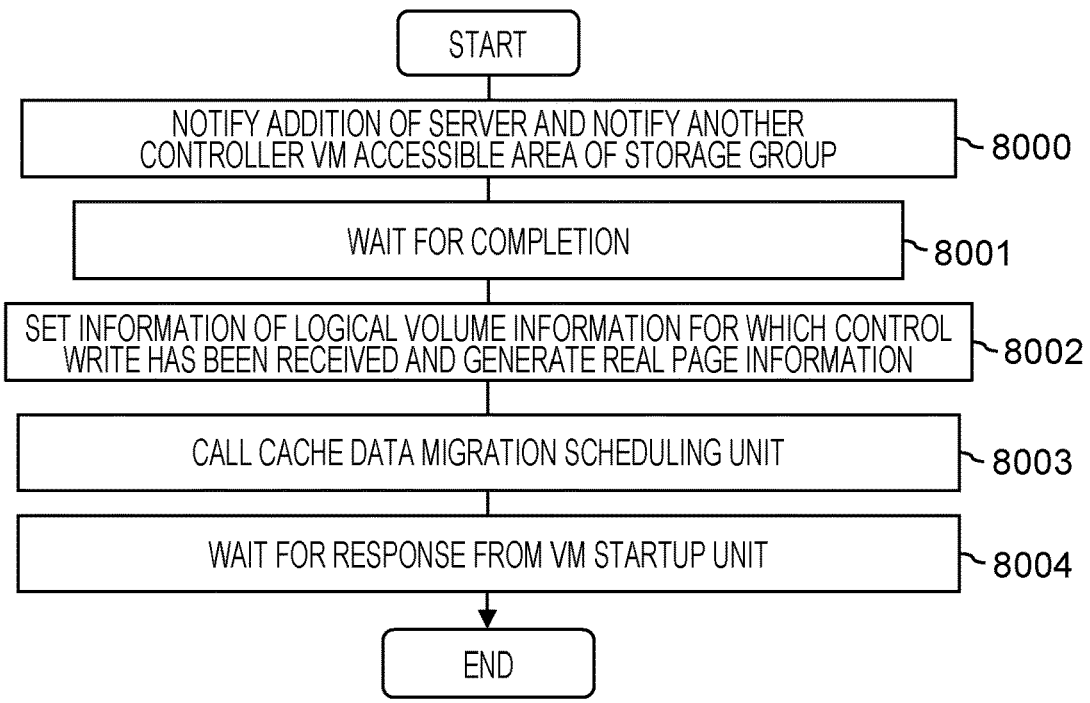
FIG. 22A is a flowchart of additional server-side processing of a server addition process according to the embodiment.

FIG. 22A is a flowchart of additional server-side processing of the server addition process according to the embodiment. The server addition process illustrated in FIG. 22A is executed by the controller VM 100 of the additional server.

Step 8000: The server addition processing unit 4300 of the controller VM 100 notifies each of the controller VMs 100 constituting the virtual storage system 190 of addition of the new server 110 and the storage box 130 that can be accessed by the relevant controller VM 100.

Step 8001: The server addition processing unit 4300 waits for a response to the notification. The notification includes a set of virtual logical volumes whose control right is passed to the controller VM 100 of this server 110.

Step 8002: The server addition processing unit 4300 sets the set of the virtual logical volumes whose control right has been inherited to the virtual logical volume information 2084 and the logical volume information 2000. In particular, the server addition processing unit 4300 generates the real page information 2100 for a set of real pages allocated to the inherited logical volumes, and sets required information such that the real page pointer 2006 of the logical volume information 200 indicates the corresponding real page information 2100. Further, the server addition processing unit 4300 generates the real page information 2100 for a real page for which an allocation right has been given, and registers the real page information 2100 in the empty page information management queue 2900 of the corresponding storage group.

Step 8003: For the logical volume for which the control right is migrated, write data remaining in the cache memory 210 of the migration source controller VM 100 needs to be written to the storage device 160. Here, the server addition processing unit 4300 starts a migration process to the cache memory 210 of the migration destination controller VM 100 if there is write data to be written to the storage device 160 in the cache memory 210 of the migration source controller VM 100 for the logical volume of the migration source. Therefore, the server addition processing unit 4300 calls the cache data migration scheduling unit 4910. However, in the present embodiment, the server addition processing unit 4300 of the migration source controller VM may directly write the write data remaining in the cache memory 210 to the storage device 160. As a result, the controller VM 100 which has inherited the control right of the logical volume can manage the write data remaining in the cache memory 210 of the logical volume using the cache memory 210, and can respond quickly to an IO request.

Step 8004: Next, the server addition processing unit 4300 communicates with the VM startup unit 4800 of the VM management unit 150, notifies that the migration of the virtual logical volume has been completed, and waits for a response from the VM startup unit 4800. When receiving the response, the server addition processing unit 4300 ends the process.

Figure 22B:
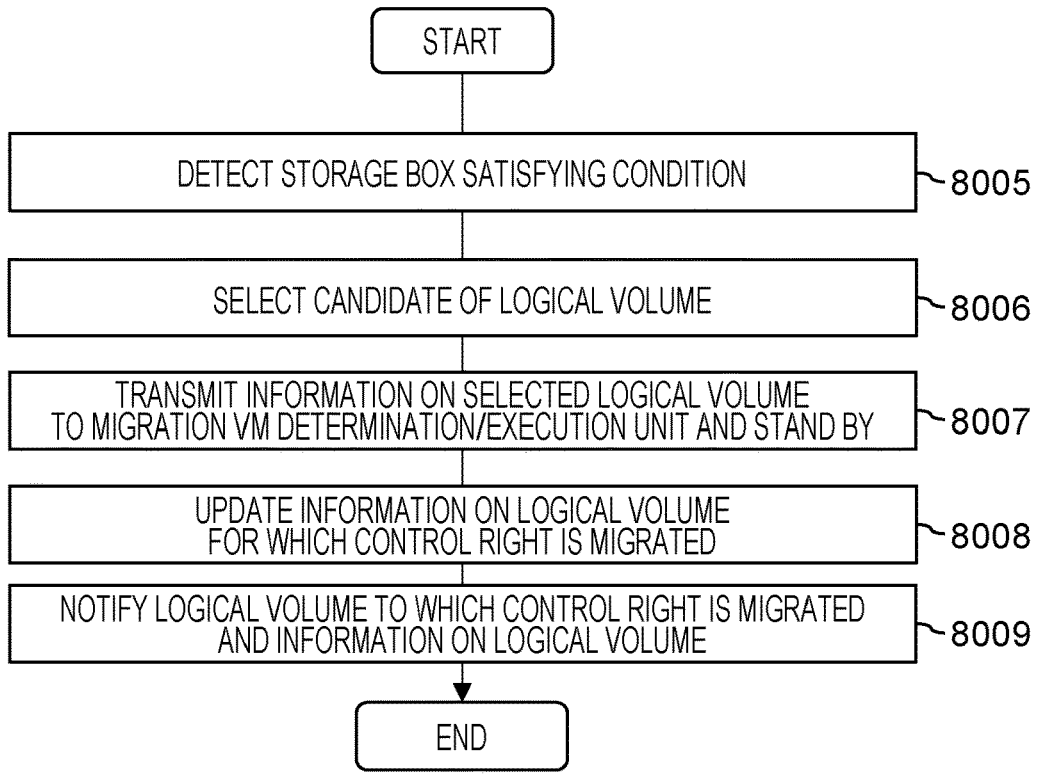
FIG. 22B is a flowchart of other server-side processing of the server addition process according to the embodiment.

FIG. 22B is a flowchart of other server-side processing of the server addition process according to the embodiment. The server addition process of FIG. 22B is executed by the controller VM 100 of the other server 110 receiving a request from an additional server.

Step 8005: The server addition processing unit 4300 of the controller VM 100 of the other server 110 detects the storage box 130 whose access right is possessed by the controller VM 100 of the additional server and whose access right is possessed by the own controller VM 100. Here, the following processing is executed for the detected storage box 130. If there is no storage box 130 that satisfies the conditions, the controller VM 100 of the additional server is notified of such a fact.

Step 8006: If there is the storage box 130 that satisfies the conditions, the server addition processing unit 4300 first grasps all virtual logical volumes defined on the storage box 130, and sets these virtual logical volumes as candidates for control right migration.

Step 8007: The server addition processing unit 4300 notifies the migration VM determination/execution unit 4600 of the VM management unit 150 of a virtual logical volume set as the migration candidate and the first read count 2007, the first write count 2008, the second read count 2009, and the second write count 2010 of a logical volume corresponding to this virtual logical volume, and waits for determination of the virtual logical volume for migration.

Step 8008: When being notified by the VM management unit 150 of the set of virtual logical volumes for which the control right is migrated, the server addition processing unit 4300 refers to the set of logical volumes corresponding to the notified virtual logical volumes and a real page pointer to recognize the real page address 2102 from the real page information 2100 of a real pages allocated to the virtual logical volume, and deletes the corresponding real page information. Further, the server addition processing unit 4300 determines an empty real page for which an allocation right is transferred in the storage group 190 belonging to the storage box 130. A real page address is recognized based on the real page information 2100 corresponding to the determined real page, and further, the real page information 2100 is removed from the empty page information management queue 2900 to delete the real page information 2100.

Step 8009: The server addition processing unit 4300 notifies the controller VM 100 of the addition server of a set of the virtual logical volume and the logical volume for which the control right is passed, the information on the address of the real page allocated to the logical volume corresponding to this set, and a set of addresses of real pages for which the allocation right is passed, and ends the process.

Next, a server deletion process executed when the server 110 is deleted will be described. Here, in the description of this process, the server 110 to be deleted is referred to as a deleted server (first server).

Figure 23A:
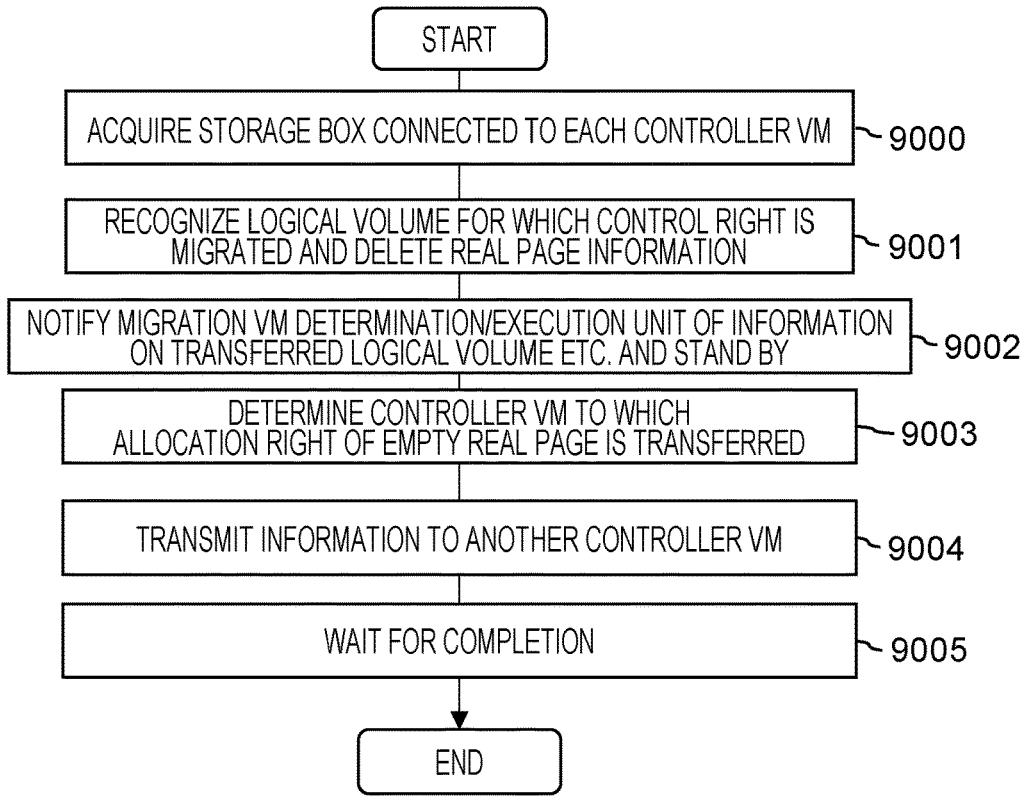
FIG. 23A is a flowchart of deleted server-side processing of a server deletion process according to the embodiment.

FIG. 23A is a flowchart of deleted server-side processing of the server deletion process according to the embodiment. The server deletion process in FIG. 23A is executed by the controller VM 100 of the deleted server.

Step 9000: The server deletion processing unit 4400 of the controller VM 100 on the server 110 performing deletion acquires information on a set of the storage boxes 130 connected to each of the controller VMs 100 via the network 120 from the other controller VMs 100 constituting the virtual storage system 190.

Step 9001: The server deletion processing unit 4400 refers to the entire logical volume information 2000 and recognizes any storage box 130 in which each logical volume has been defined. In addition, the server deletion processing unit 4400 recognizes an empty real page for each storage group of the respective storage boxes 130.

Step 9002: The server deletion processing unit 4400 notifies the migration VM determination/execution unit 4600 of information on the storage boxes 130 connected to the respective controller VMs 100, information on the storage boxes 130 in which all the logical volumes are defined, a set of virtual logical volumes corresponding to the logical volumes, the first read count 2007, the first write count 2008, the second read count 2009, and the second write count 2010, and waits for reception of an instruction of the migration destination controller VM 100 to which a control right for each of the logical volumes is migrated.

Step 9003: The server deletion processing unit 4400 determines any migration destination controller VM 100 for each of real pages whose allocation rights are possessed by the migration source controller VM 100. The server deletion processing unit 4400 grasps an address of a real page allocated to a logical volume and deletes the corresponding real page information 2100, and grasps an address of a real page to which the allocation right is transferred and deletes the corresponding real page information 2100.

Step 9004: The server deletion processing unit 4400 notifies the migration destination controller VM 100 of a virtual logical volume for which transfer of the control right has been determined, a set of logical volumes for which the control right is transferred, address information of the real page allocated to the corresponding logical volume, and a set of addresses of real pages for which the allocation right is transferred.

Step 9005: The server deletion processing unit 4400 waits for a response from the notified controller VM 100 and completes the process when receiving the response.

Next, processing on the other server 110 side that has received a request from the controller VM 100 of the deleted server in the server deletion process will be described.

Figure 23B:
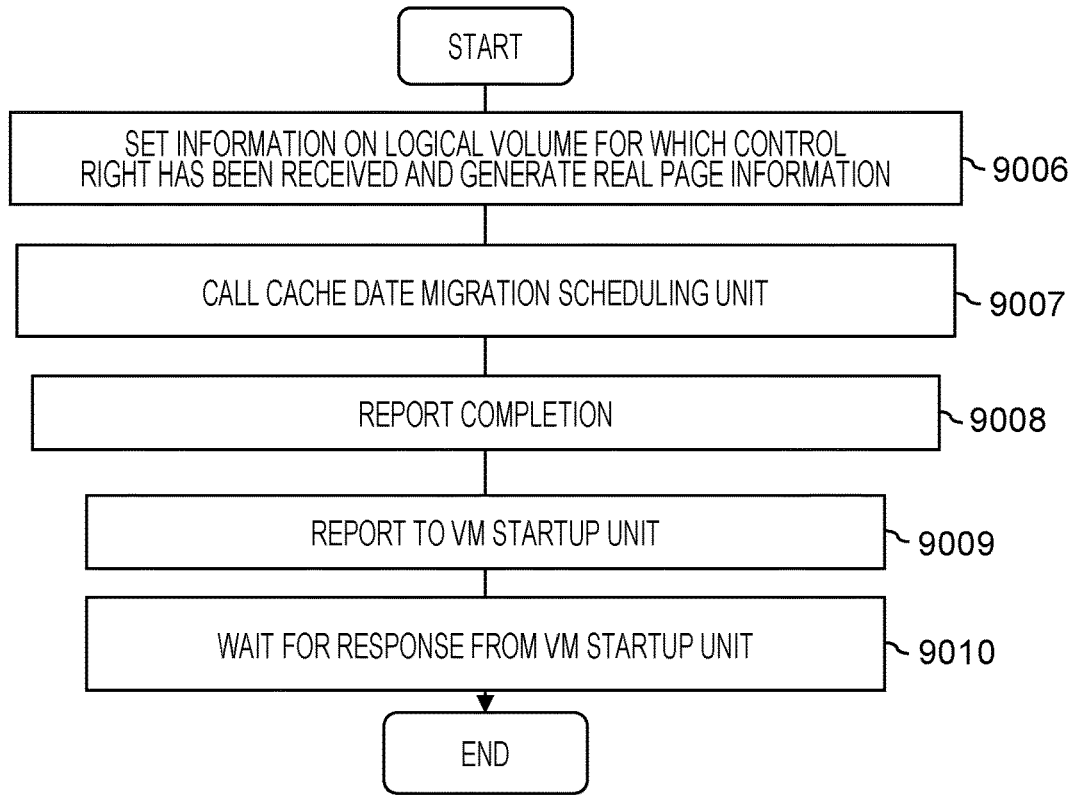
FIG. 23B is a flowchart of other server-side processing of the server deletion process according to the embodiment.

FIG. 23B is a flowchart of the other server-side processing of the server deletion process according to the embodiment. The server deletion process of FIG. 23B is executed by the controller VM 100 of the other server 110.

Step 9006: The server deletion processing unit 4400 of the controller VM 100 sets information on a virtual logical volume and information on a logical volume received from the controller VM 100 to be deleted in the virtual logical volume information 2084 and the logical volume information 2000. However, an identifier of the logical volume is determined by this controller VM 100, and is set in the logical volume identifier 2089 of the virtual logical volume information 2084 and the logical volume identifier 2001 of the logical volume information 2000. In addition, the server deletion processing unit 4400 generates the real page information 2100 for each real page allocated to the logical volume, and sets required information such as a real page address. In addition, the server deletion processing unit 4400 sets an address of the real page information 2100 in the corresponding real page pointer 2006. In addition, the server deletion processing unit 4400 generates the real page information 2100 corresponding to the real page whose allocation right has been determined to be migrated to this controller VM 100, sets required information, and registers the generated real page information 2100 in the empty page information management queue 2900. As a result, the allocation right of the real page can be appropriately transferred to the other server 110.

Step 9007: When an attempt is made to delete the server 110 and deactivate the controller VM 100, it is necessary to migrate write data remaining in the cache memory 210 of the controller VM 100 of the deleted server to another controller VM 100. In particular, when the cache memories 210 are duplicated and one of the cache memories 210 is deactivated, it is advantageous to transfer the write data to the other controller VM 100 to be duplicated and deactivate the controller VM 100 in which a failure has occurred in terms of achieving high reliability. Therefore, when an attempt is made to deactivate the controller VM 100, it is necessary to write the write data remaining in the cache memory 210 to the storage device 160. Here, if there is write data to be written to the storage device 160 in a logical volume of the controller VM 100 to be deactivated, a process of migrating the write data to the cache memory 210 of the migration destination controller VM 100 is executed. Therefore, the server deletion processing unit 4400 calls the cache data migration scheduling unit 4910. However, the migration source controller VM 100 may write the write data remaining in the cache memory 210 directly to the storage device 160.

Step 9008: Then, the server deletion processing unit 4400 reports the completion of the process to the controller VM 100 to be deactivated.

Step 9009: The server deletion processing unit 4400 informs the VM startup unit 4800 that the migration of the control right of the logical volume has been completed.

Step 9010: The server deletion processing unit 4400 waits for the completion report from the VM startup unit 4800, and ends the process after the completion.

Next, a server migration process executed when the application VM is migrated from the migration source server 110 to the migration destination server 110 will be described. Such a case corresponds to, for example, a case where the migration source server (first server) is replaced with the migration destination server (second server).

Figure 24A:
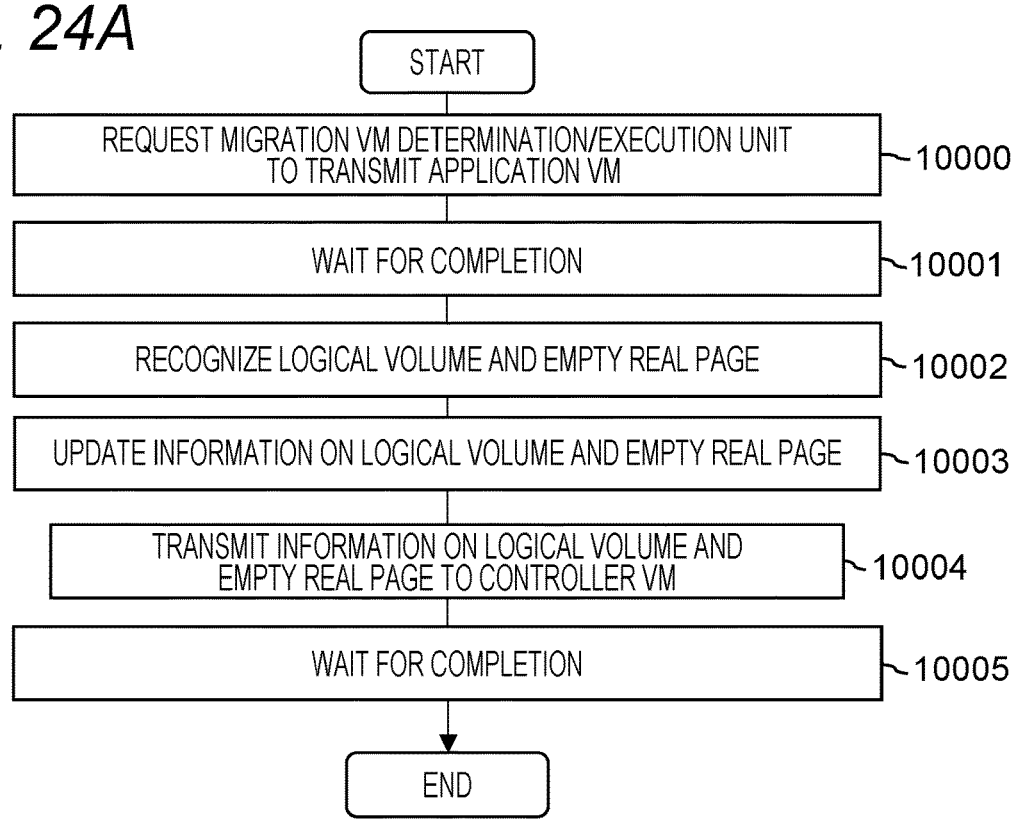
FIG. 24A is a flowchart of migration source server-side processing of a server migration process according to the embodiment.

FIG. 24A is a flowchart of migration source server-side processing of the server migration process according to the embodiment. The server migration process of FIG. 24A is executed by the server migration processing unit 4500 of the controller VM 100 of the migration source server 110.

In the server migration process, control rights of all logical volumes of the controller VM 100 of the migration source server 110 are transferred to the controller VM 100 of the migration destination server 110. In addition, all real pages for which the controller VM 100 of the migration source server 110 has allocation rights are transferred to the controller VM 100 of the migration destination server 110. In addition, it is assumed that the migration source server 110 and the migration destination server 110 can access the same storage box 130.

Step 10000: The server migration processing unit 4500 contacts the migration VM determination/execution unit 4600 and requests for migration of the application VM 140 to the migration destination server 110.

Step 10001: The server migration processing unit 4500 waits for completion of the request.

Step 10002: The server migration processing unit 4500 refers to the logical volume information 2100 and recognizes a logical volume defined in the storage box 130. In addition, the server migration processing unit 4500 recognizes an empty real page for each storage group of the respective storage boxes 130.

Step 10003: The server migration processing unit 4500 grasps an address of a real page allocated to the logical volume, deletes the real page information 2100 corresponding to the real page, grasps an address of the real page for which an allocation right is transferred, and deletes the real page information 2100 corresponding to the real page in order to migrate each of the real pages for which the control rights and allocation rights of all logical volumes are possessed by the migration source controller VM 100 to the migration destination controller VM 100.

Step 10004: The server migration processing unit 4500 notifies the migration destination controller VM 100 of all virtual logical volumes, information on the logical volume, the real page for which the allocation right is transferred, and information on an empty real page.

Step 10005: The server migration processing unit 4500 waits for a response to complete the process.

Next, processing of the controller VM 100 of the migration destination server 110 that has received a request from the migration source controller VM 100 in the server migration process will be described.

Figure 24B:
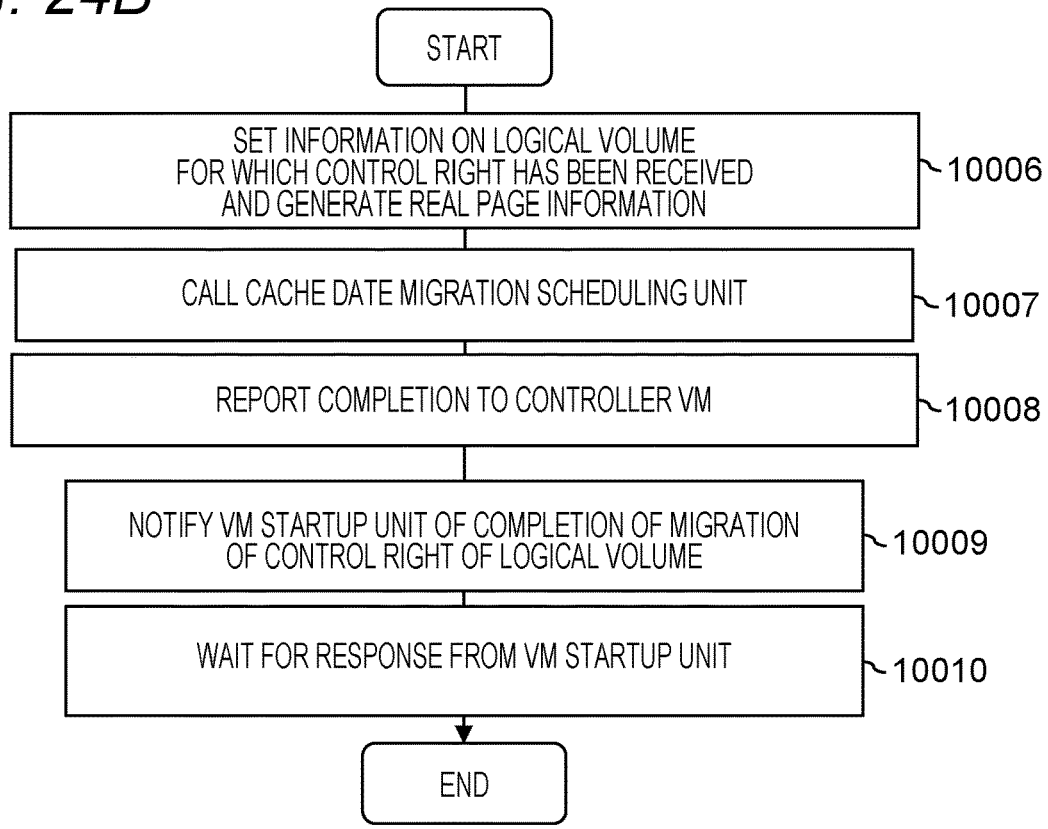
FIG. 24B is a flowchart of migration destination server-side processing of the server migration process according to the embodiment.

FIG. 24B is a flowchart of migration destination server-side processing of the server migration process according to the embodiment. The server migration process of FIG. 24B is executed by the server migration processing unit 4500 of the controller VM 100 of the migration destination server 110.

Step 10006: The server migration processing unit 4500 sets information on a virtual logical volume and information on a logical volume received from the migration source controller VM 100 in the virtual logical volume information 2084 and the logical volume information 2000. However, an identifier of the logical volume is determined by this controller VM 100, and is set in the logical volume identifier 2089 of the virtual logical volume information 2084 and the logical volume identifier 2001 of the logical volume information 2000. In addition, the server migration processing unit 4500 generates the real page information 2100 for each real page allocated to the logical volume, and sets required information such as a real page address. In addition, the server migration processing unit 4500 sets an address of the real page information 2100 in the corresponding real page pointer 2006. In addition, the server migration processing unit 4500 generates the real page information 2100 corresponding to the real page whose allocation right has been determined to be migrated to this controller VM 100, sets required information, and registers the generated real page information 2100 in the empty page information management queue 2900.

Step 10007: When performing the migration, write data remaining in the cache memory 210 needs to be written to the storage device 160. Here, the migration process to the cache memory 210 of the migration destination controller VM 100 is performed if there is write data to be written to the storage device 160 in the cache memory 210 of the migration source controller VM 100 for the logical volume of the migration source. Therefore, the server migration processing unit 4500 calls the cache data migration scheduling unit 4910.

Step 10008: The server migration processing unit 4500 reports the completion of the process to the migration source controller VM 100.

Step 10009: The server migration processing unit 4500 reports the completion of the migration of the control right of the logical volume to the VM startup unit 4800.

Step 10010: The server migration processing unit 4500 waits for the completion report from the VM startup unit 4800 and ends the process.

Next, a cache data migration management process will be described.

Figure 25:
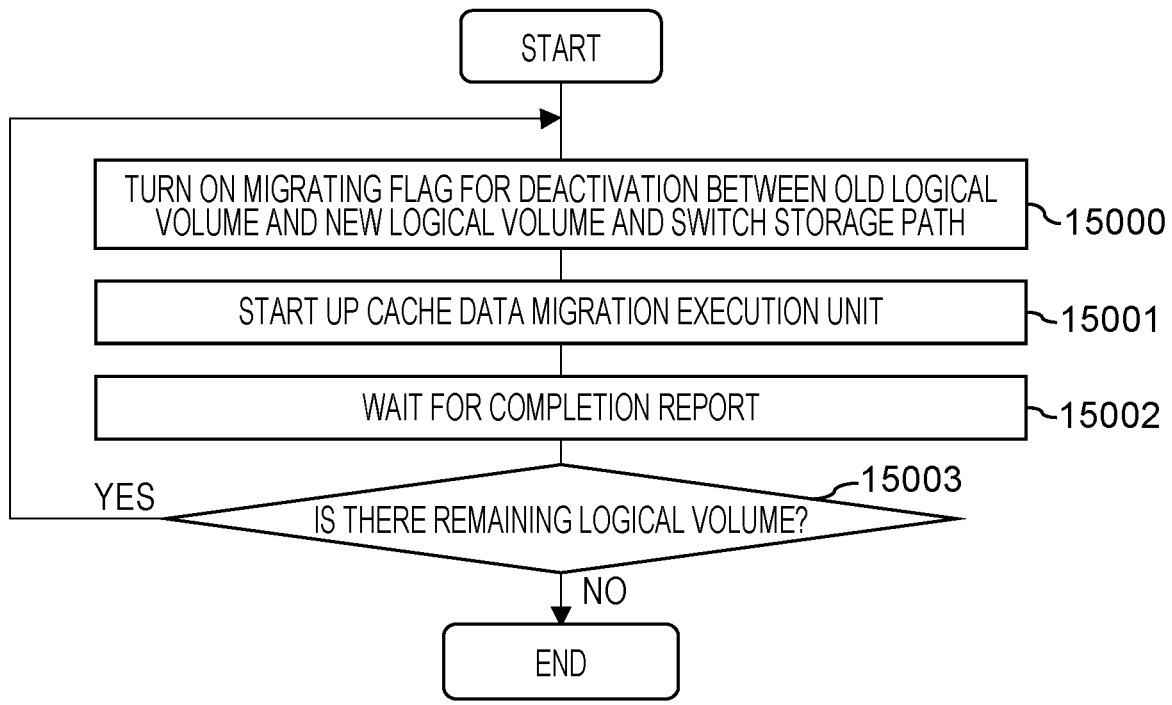
FIG. 25 is a flowchart of a cache data migration management process according to the embodiment.

FIG. 25 is a flowchart of the cache data migration management process according to the embodiment.

The cache data migration management process is a process executed by the cache data migration scheduling unit 4910 in the controller VM 100 which inherits the logical volume from the controller VM 100 to be deactivated and the controller VM 100 as a migration destination of the logical volume.

Step 15000: The cache data migration scheduling unit 4910 turns on the migrating flag for deactivation 2019 of the logical volume information 2000 of the logical volume to be inherited and the logical volume as the migration destination, and sets a logical volume of a migration source and an identifier of the migration source controller VM 100 in the migration source LUN for deactivation 2020.

Step 15001: The cache data migration scheduling unit 4910 starts up the cache data migration processing unit 4920 that performs copying in units of logical volumes.

Step 15002: The cache data migration scheduling unit 4910 waits for a completion report of any one of the logical volumes.

Step 15003: The cache data migration scheduling unit 4910 checks whether there is an unprocessed logical volume regarding the logical volume to be inherited and the logical volume as the migration destination. If there is the unprocessed logical volume (Step 15003: Y), the cache data migration scheduling unit 4910 advances the processing to Step 15002. On the other hand, if there is no unprocessed logical volume (Step 15003: N), the cache data migration scheduling unit 4910 completes the process.

Next, a cache data migration process will be described.

Figure 26A:
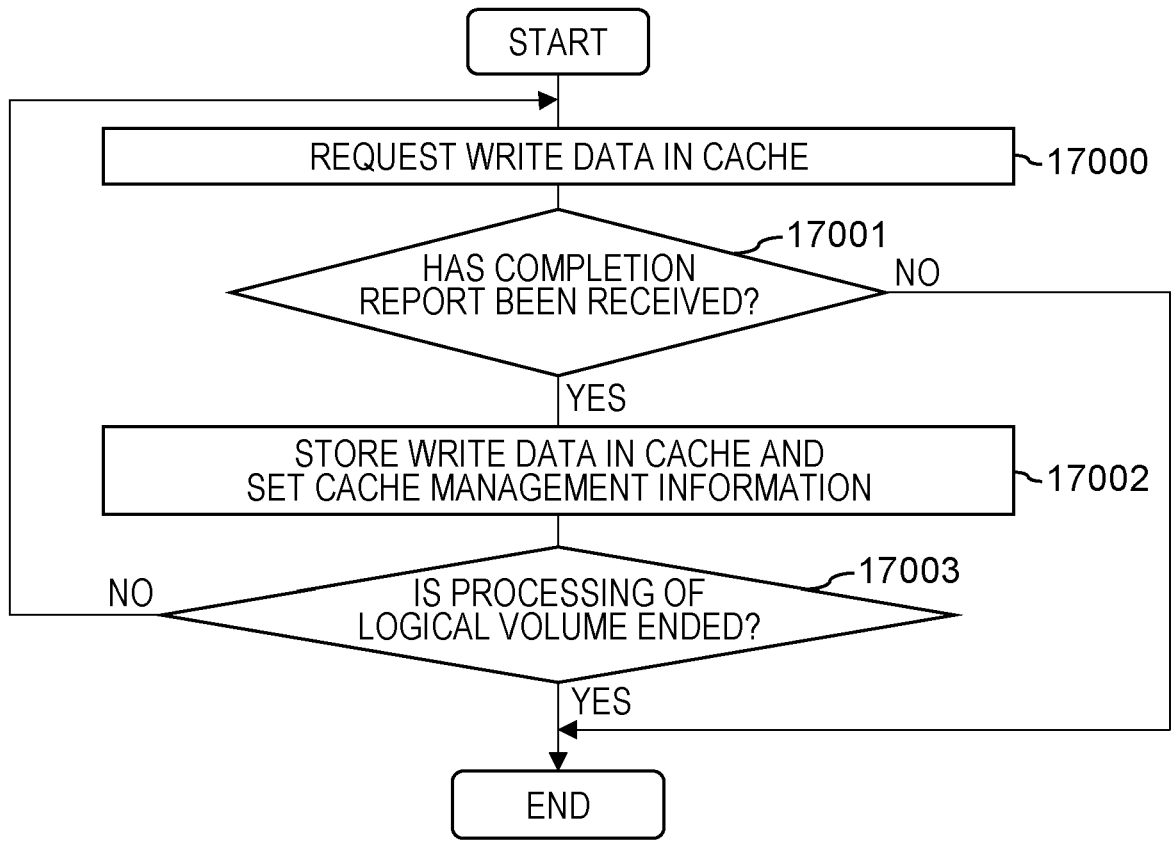
FIG. 26A is a flowchart of migration destination server-side processing of a cache data migration process according to the embodiment.

FIG. 26A is a flowchart of migration destination server-side processing of the cache data migration process according to the embodiment. The cache data migration process of FIG. 26A is a process executed by the controller VM 100 that inherits a logical volume and the migration destination controller VM 100.

Step 17000: The cache data migration processing unit 4920 of the controller VM 100 specifies identifiers of the controller VM 100 and a logical volume and an address of the migration pointer 2017, included in the migration source LUN for deactivation 2020 of the logical volume information 2000 of a migration target, and makes a request to the migration source controller VM 100 so as to transfer write data remaining in the cache memory 210 after the address.

Step 17001: The cache data migration processing unit 4920 determines whether the requested data has been received. As a result, when the data is not received (Step 17001: N), the cache data migration processing unit 4920 ends the process. When the data is received (Step 17001: Y), the cache data migration processing unit 4920 advances to the processing to Step 17002.

Step 17002: The cache data migration processing unit 4920 stores the received data in the cache memory 210, sets the next address of the received data in the copy pointer 2017, and advances the processing to Step 17003.

Step 17003: The cache data migration processing unit 4920 determines whether a process of migrating cache data of a logical volume is completed. If the process of migrating the cache data is not completed (Step 17003: N), the cache data migration processing unit 4920 advances the processing to Step 17000. On the other hand, when the process is completed (Step 17003: Y), this means that the entire data has been received. Thus, the completion is reported to the cache data migration scheduling unit 4910, and then, the process is completed.

Next, processing of the migration source controller VM 100 in the cache data migration process will be described.

Figure 26B:
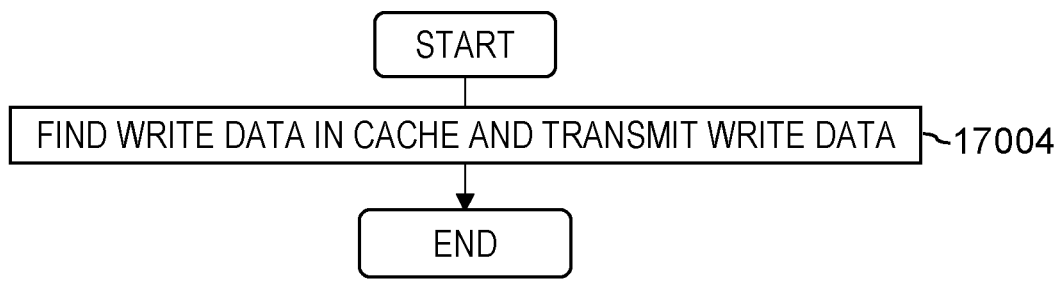
FIG. 26B is a flowchart of migration source server-side processing of the cache data migration process according to the embodiment.

FIG. 26B is a flowchart of migration source server-side processing of the cache data migration process according to the embodiment.

Step 17004: The cache data migration processing unit 4920 of the migration source controller VM 100 searches for whether write data that needs to be written to the storage device 160 remains in the cache memory 210 based on an address of a logical volume received from the migration destination controller VM 100. If finding the write data, the cache data migration processing unit 4920 transfers this write data and the address on the logical volume to the migration source controller VM 100, and ends the process.

Next, a migration VM determination and execution process will be described.

Figure 27:
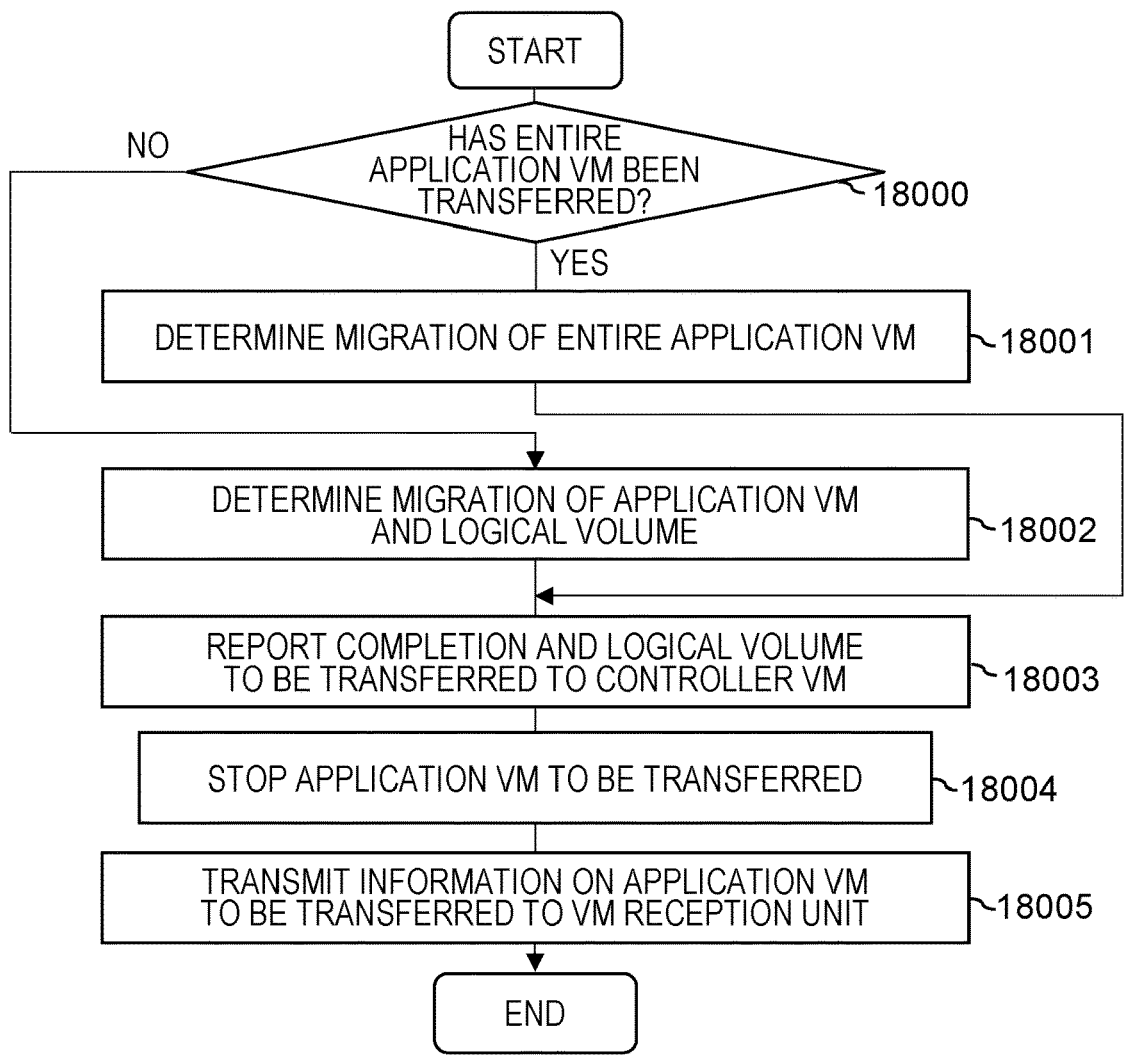
FIG. 27 is a flowchart of a migration VM determination and execution process according to the embodiment.

FIG. 27 is a flowchart of the migration VM determination and execution process according to the embodiment.

In the migration VM determination and execution process, the migration VM determination/execution unit 4600 determines the application VM 140 to be migrated to another server 110 based on information received from the controller VM 100, the first processor usage 250, the second processor usage 260, and the like of the application VM management information of the application VM 140.

Step 18000: The migration VM determination/execution unit 4600 checks whether an instruction received from the controller VM 100 is an instruction to migrate all the application VMs 140. As a result, in the case of the instruction to migrate all the application VMs 140 (Step 18000: Y), the migration VM determination/execution unit 4600 advances the processing to Step 18001. On the other hand, when it is not the instruction to migrate all the application VMs 140 (Step 18000: N), the migration VM determination/execution unit 4600 advances the processing to Step 18002.

Step 18001: The migration VM determination/execution unit 4600 sets all the application VMs as migration targets and advances the processing to Step 18003.

Step 18002: The migration VM determination/execution unit 4600 determines any application VM 140 to be migrated and the migration destination server 110 based on information on a logical volumes as a migration candidate included in the instruction received from the controller VM 100, and the first processor usage 250, the second processor usage 260, and the virtual logical volume number 270 as the application VM management information of the application VM 140. Further, the migration VM determination/execution unit 4600 sets a logical volume corresponding to the virtual logical volume number 270 used by the application VM 140 as a migration target, and determines the controller VM 100 of the server 110 determined as the migration destination as a migration destination. As a result, the application VM 140 and a control right of the logical volume used by the application VM 140 are set as migration targets with respect to the migration destination server 110. As a result, it is guaranteed that the application VM 140 can quickly perform IO processing on the logical volume to be used on the migration destination server 110.

Step 18003: The migration VM determination/execution unit 4600 reports the completion of the process to the controller VM 100. At this time, when transferring control rights of some logical volumes, the migration VM determination/execution unit 4600 notifies the controller VM 100 of a virtual logical volume for which the control right has been determined to be migrated, the logical volume, and the migration destination controller VM 100.

Step 18004: The migration VM determination/execution unit 4600 stops the application VM 140 determined to be migrated.

Step 18005: The migration VM determination/execution unit 4600 sends information required to execute the application VM 140 on the migration destination server 110 to the VM reception unit 4700 of the migration destination server 110. Thereafter, the migration VM determination/execution unit 4600 completes the process.

Next, a migration VM reception process will be described.

Figure 28:
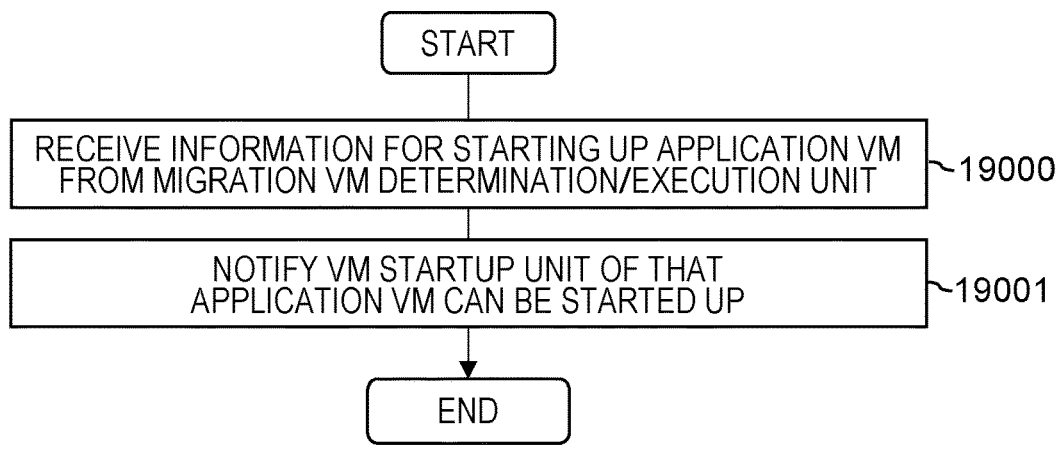
FIG. 28 is a flowchart of a migration VM reception process according to the embodiment.

FIG. 28 is a flowchart of the migration VM reception process according to the embodiment.

The migration VM reception process is a process executed by the VM reception unit 4700.

Step 19000: The VM reception unit 4700 receives information required to start up the application VM 140 on the own server 110 from the migration VM determination/execution unit 4600.

Step 19001: The VM startup unit 4800 is notified of that the startup of the application VM 140 has been prepared. Thereafter, the VM startup unit 4800 ends the process.

Next, an application VM startup control process will be described.

Figure 29A:
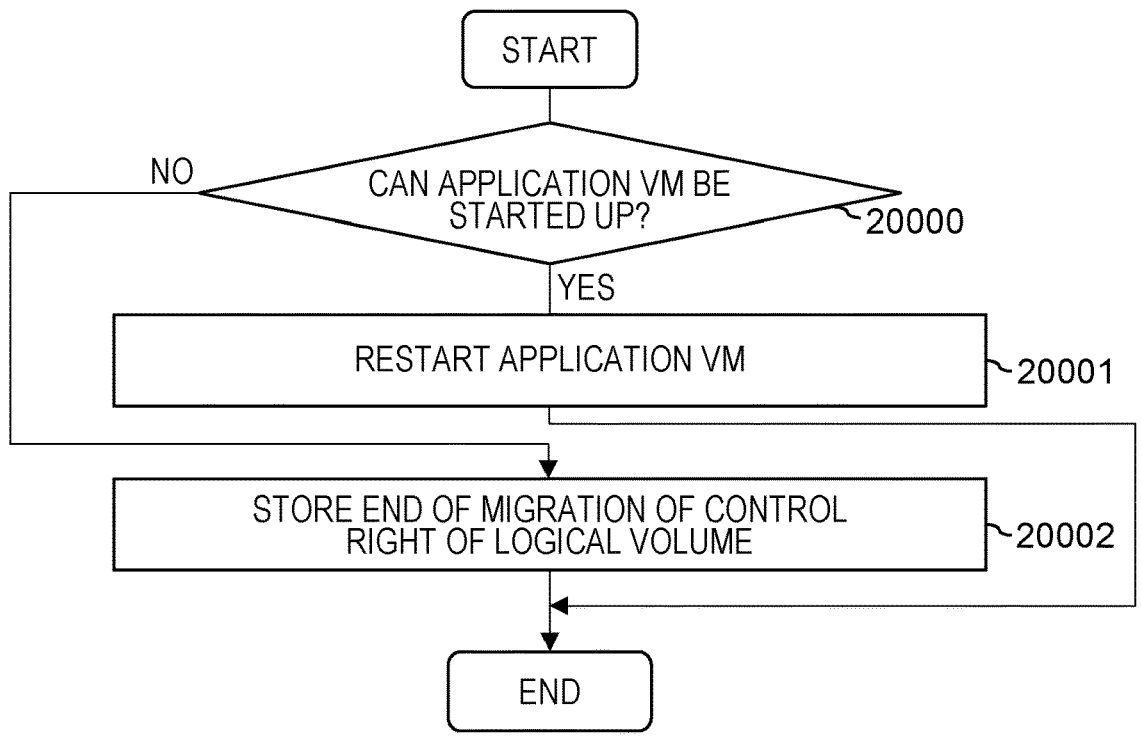
FIG. 29A is a flowchart of a first application VM startup control process according to the embodiment.

FIG. 29A is a flowchart of a first application VM startup control process according to the embodiment. The first application VM startup control process indicates a process executed at the time of receiving the notification (Step 10009) of the completion of migration of the control right of the logical volume from the controller VM 100.

Step 20000: The VM startup unit 4800 checks whether the application VM 140 can be start up. Specifically, the VM startup unit 4800 checks whether a state where the application VM 140 can be started up has been stored by Step 20005 to be described later. As a result, if the application VM 140 can be started up (Step 20000: Y), the VM startup unit 4800 advances the processing to Step 20001. On the other hand, if the state where the application VM 140 can be started up is not achieved (Step 20000: N), the VM startup unit 4800 advances the processing to Step 20002.

Step 20001: Since a state where the application VM 140 can be restarted has been already achieved, the VM startup unit 4800 restarts the application VM 140 and completes the process.

Step 20002: The VM startup unit 4800 stores the completion of migration of the control right of the logical volume and ends the process.

Next, a second application VM startup control process will be described.

Figure 29B:
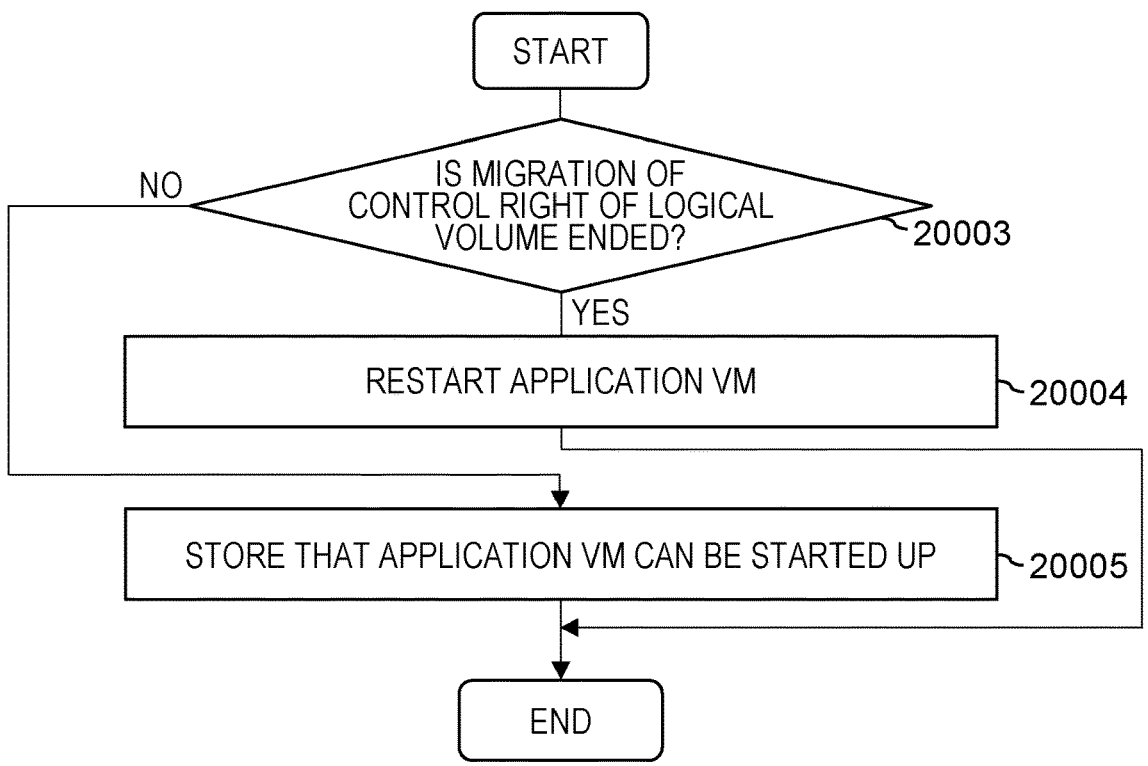
FIG. 29B is a flowchart of a second application VM startup control process according to the embodiment.

FIG. 29B is a flowchart of the second application VM startup control process according to the embodiment. The second application VM startup control process indicates a process executed at the time of receiving the notification (Step 19001) of the state where the application VM 140 can be started from the VM reception unit 4700.

Step 20003: The VM startup unit 4800 checks whether the migration of the control right of the logical volume is ended. Specifically, the VM startup unit 4800 checks whether the end of the migration of the control right of the logical volume has been stored by Step 20002. As a result, if the migration of the control right of the logical volume is ended (Step 20003: Y), the VM startup unit 4800 advances the processing to Step 20004. On the other hand, if the migration of the control right of the logical volume is not ended (Step 20003: N), the VM startup unit 4800 advances the processing to Step 20005.

Step 20004: Since the migration of the control right of the logical volume has already been ended, the VM startup unit 4800 restarts the application VM 140 and completes the process.

Step 20005: The VM startup unit 4800 stores the state where the application VM 140 can be started up and ends the process.

Incidentally, the present invention is not limited to the above-described embodiment, and can be appropriately modified and implemented within a range not departing from a spirit of the present invention.

For example, some or all of the processes performed by the processor in the above embodiment may be performed by a hardware circuit. In addition, the program in the above embodiment may be installed from a program source. The program source may be a program distribution server or a storage media (for example, a portable storage media).

What is claimed is:

1. A compound storage system comprising:
a storage box having a plurality of storage devices; and
a plurality of servers capable of executing one or more virtual machines,
wherein the storage box stores a logical volume,
the virtual machines executable by the server include an application virtual machine (VM) that executes an application using the logical volume, and a controller VM that configures a controller capable of controlling read and write with respect to a logical volume for which the controller has a control right,
when a predetermined situation occurs in which an application VM of a migration source server is migrated to a predetermined migration destination server,
at least one processor of the one or more servers in the compound storage system is configured to:
migrate the application VM to the migration destination server,
migrate a control right of a logical volume used by the application VM to a controller VM of the migration destination server, and
transfer cache data stored in a cache memory of a controller VM of the migration source server of a logical volume used by the application VM to a cache memory of a controller VM of the migration destination server.

2. The compound storage system according to claim 1, wherein the predetermined situation is when a new server is added to the compound storage system, and the migration destination server is the new server.

3. The compound storage system according to claim 1, wherein the predetermined situation is when a migration source server having an application VM is deleted, and the migration destination server is another server of the compound storage system.

4. The compound storage system according to claim 1, wherein the predetermined situation is when a migration source server having an application VM is replaced with a new server, and the migration destination server is the server for replacement.

5. A compound storage system comprising:
a storage box having a plurality of storage devices; and
a plurality of servers capable of executing one or more virtual machines,
wherein the storage box stores a logical volume,
the virtual machines executable by a server include an application VM that executes an application using the logical volume, and a controller VM that configures a controller capable of controlling read and write with respect to a logical volume for which the controller has a control right,
when a predetermined situation occurs in which a configuration of the server of the integrated storage system is changed,
at least one processor of the one or more servers in the compound storage system is configured to:
transfer a right to allocate a storage area of the storage box possessed by a first server to a controller VM of a second server, and
transfer cache data stored in a cache memory of a controller VM of the migration source server of a logical volume used by the application VM to a cache memory of a controller VM of the migration destination server.

6. The compound storage system according to claim 5, wherein the predetermined situation is a situation in which the second server is added to the compound storage system.

7. The compound storage system according to claim 5, wherein the predetermined situation is a situation in which the first server is deleted from the compound storage system.

8. The compound storage system according to claim 5, wherein the predetermined situation is a situation in which the first server is replaced with the second server.

* * * * *